(12) United States Patent
Erickson et al.

(10) Patent No.: US 10,647,053 B2
(45) Date of Patent: May 12, 2020

(54) THREE-DIMENSIONAL (3D) PRINTING

(71) Applicant: Hewlett-Packard Development Company, L.P., Houston, TX (US)

(72) Inventors: Kristopher J. Erickson, Palo Alto, CA (US); Lihua Zhao, Sunnyvale, CA (US); Howard S. Tom, San Jose, CA (US); Aja Hartman, Palo Alto, CA (US); Yan Zhao, Palo Alto, CA (US); Andrew E. Fitzhugh, Menlo Park, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 30 days.

(21) Appl. No.: 16/072,123

(22) PCT Filed: May 12, 2016

(86) PCT No.: PCT/US2016/032027
§ 371 (c)(1),
(2) Date: Jul. 23, 2018

(87) PCT Pub. No.: WO2017/196330
PCT Pub. Date: Nov. 16, 2017

(65) Prior Publication Data
US 2019/0030788 A1    Jan. 31, 2019

(51) Int. Cl.
*B27N 5/00* (2006.01)
*B29C 41/22* (2006.01)
(Continued)

(52) U.S. Cl.
CPC .......... *B29C 64/112* (2017.08); *B29C 64/165* (2017.08); *B29C 64/264* (2017.08);
(Continued)

(58) Field of Classification Search
CPC ......... B27N 5/00; B29C 41/22; B29C 64/165; B29C 64/264; B29C 67/04; B29C 70/28; B29C 71/04
(Continued)

(56) References Cited

U.S. PATENT DOCUMENTS 6,574,523 B1    6/2003  Hanna et al.
2004/0145088 A1  7/2004  Patel et al.
(Continued)

FOREIGN PATENT DOCUMENTS

CN    101213070    7/2008
CN    102186653    9/2011
(Continued)

OTHER PUBLICATIONS

HP Multi Jet FusionTM Technology; (2015) Available at: http://www8.hp.com/h20195/v2/getpdf.aspx/4AA5-5472ENW.pdf?ver=4.

(Continued)

*Primary Examiner* — Leo B Tentoni
(74) *Attorney, Agent, or Firm* — Dierker & Kavanaugh PC

(57) ABSTRACT

In an example of a three-dimensional (3D) printing method, a polymeric build material is applied. A fusing agent is selectively applied on at least a portion of the polymeric build material. A mechanical tailoring agent is selectively applied on at least a region of the portion. The polymeric build material is exposed to radiation, thereby fusing the at least the portion of the polymeric build material in contact with the fusing agent to form a layer. The mechanical tailoring agent forms a composite layer in the at least the region, and the composite layer has a different mechanical property than that of an area of the layer not in contact with the mechanical tailoring agent.

15 Claims, 7 Drawing Sheets

(51) Int. Cl.
*B29C 67/04* (2017.01)
*B29C 70/28* (2006.01)
*B29C 71/04* (2006.01)
*B29C 64/112* (2017.01)
*B33Y 70/00* (2020.01)
*B33Y 10/00* (2015.01)
*B33Y 50/02* (2015.01)
*B29C 67/00* (2017.01)
*B29C 64/165* (2017.01)
*B29C 64/264* (2017.01)

(52) U.S. Cl.
CPC .............. *B29C 67/00* (2013.01); *B33Y 10/00* (2014.12); *B33Y 50/02* (2014.12); *B33Y 70/00* (2014.12); *B32B 2398/20* (2013.01)

(58) Field of Classification Search
USPC ........ 264/112, 113, 255, 460, 461, 462, 463
See application file for complete search history.

(56) References Cited

U.S. PATENT DOCUMENTS

| | | |
|---|---|---|
| 2005/0093208 A1 | 5/2005 | Boyd et al. |
| 2005/0278056 A1 | 12/2005 | Farnworth et al. |
| 2007/0036964 A1 | 2/2007 | Rosenberger et al. |
| 2013/0189028 A1 | 7/2013 | Gershenfeld et al. |

FOREIGN PATENT DOCUMENTS

| | | |
|---|---|---|
| CN | 104785780 | 7/2015 |
| CN | 105127424 | 12/2015 |
| EP | 1201404 | 5/2002 |
| EP | 2463082 | 6/2012 |
| EP | 3086920 | 11/2016 |
| GB | 2526905 A | 12/2015 |
| WO | WO-0114460 | 3/2001 |
| WO | WO-2007114895 | 10/2007 |
| WO | WO-2015106816 A1 | 6/2014 |
| WO | WO-2015092467 | 6/2015 |
| WO | WO-2015167530 | 11/2015 |

OTHER PUBLICATIONS

HP Reveals More About Their Multi Jet Fusion 3D Printer Expected in Late 2016, More Models Will Follow (Jan. 5, 2016) Available at: http://www.3ders.org/articles/20160105-hp-reveals-more-multi-jet-fusion-3d-printer-expected-in-late-2016.htm.

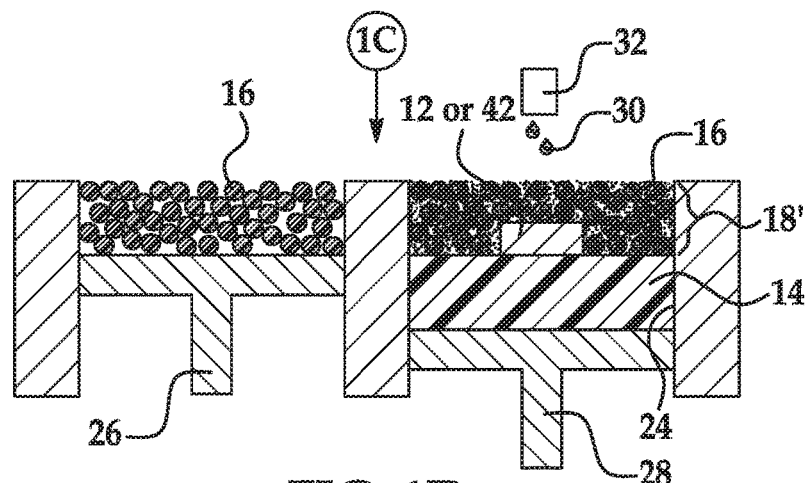
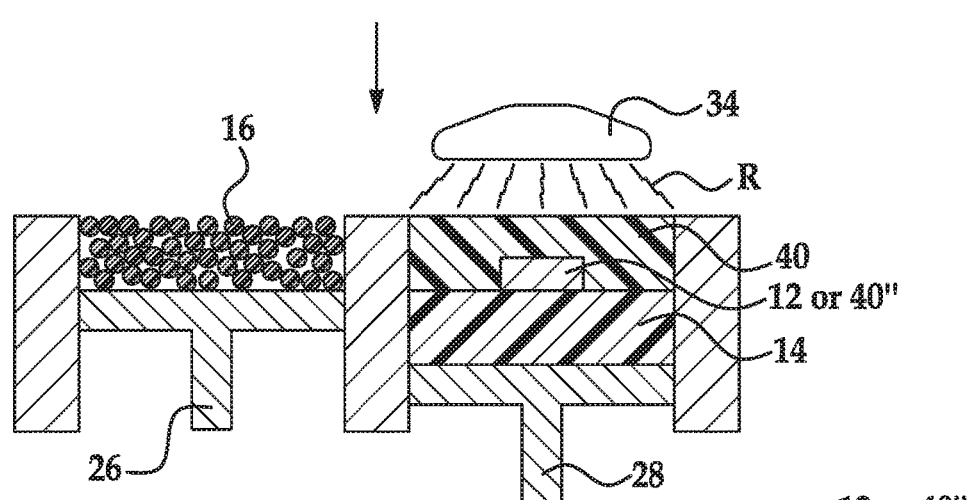
FIG. 1D
FIG. 1E
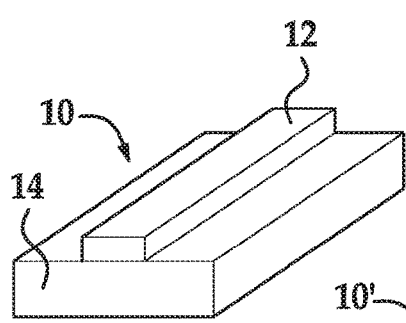
FIG. 2
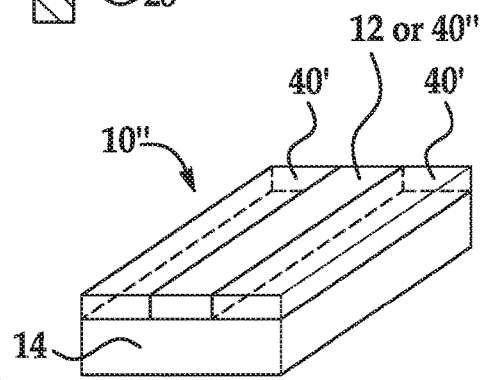
FIG. 3B
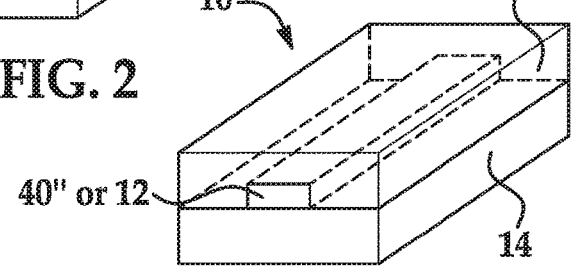
FIG. 3A

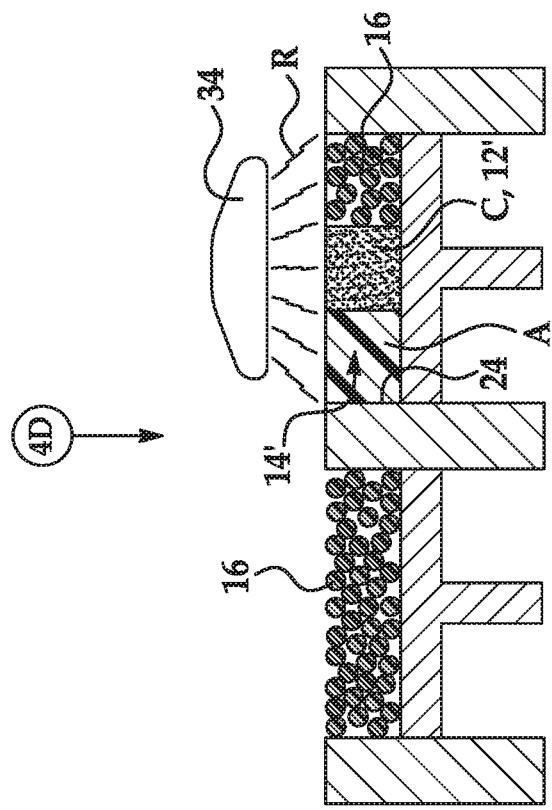
FIG. 4D
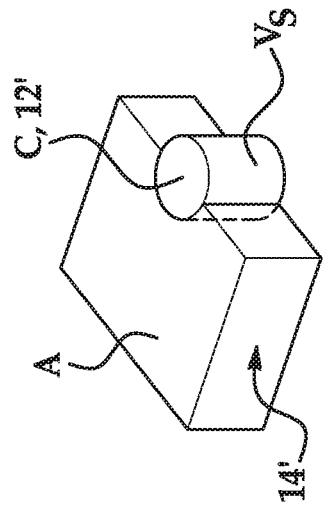
FIG. 4E
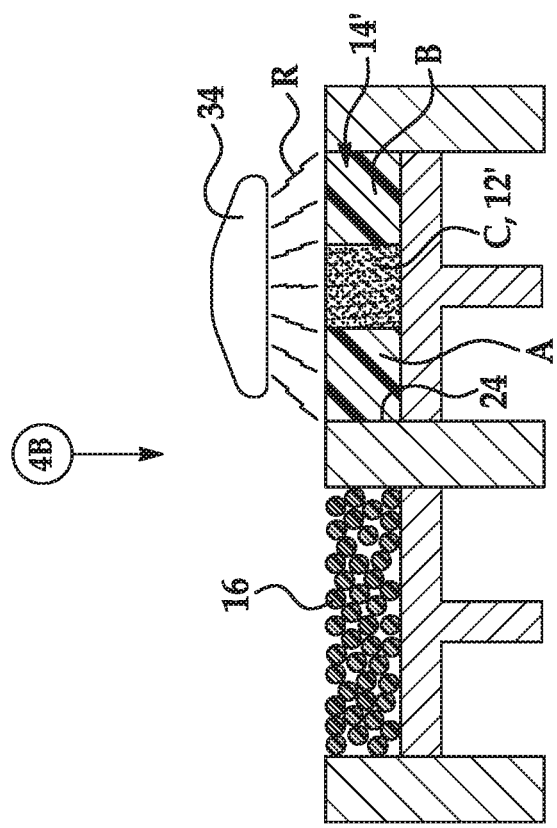
FIG. 4B
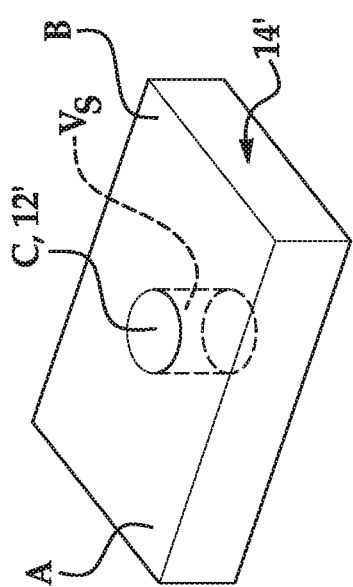
FIG. 5A
FIG. 5B

THREE-DIMENSIONAL (3D) PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A-1E are semi-schematic, cross-sectional views depicting two examples of the 3D printing method disclosed herein;

FIG. 2 is a perspective view depicting an example of a 3D part formed by the method shown in FIGS. 1A-1C;

FIGS. 3A and 3B are perspective views depicting other examples of 3D parts formed by the method shown in FIGS. 1A-1E;

FIGS. 4A-4C are semi-schematic, cross-sectional views depicting another example of the 3D printing method disclosed herein;

FIGS. 4A, 4D and 4E are semi-schematic, cross-sectional views depicting still another example of the 3D printing method disclosed herein;

FIGS. 5A and 5B are perspective views depicting examples of 3D parts formed, respectively, by the method shown in FIGS. 4A-4C and the method shown in FIGS. 4A, 4D and 4E;

DETAILED DESCRIPTION

Figure 1A:
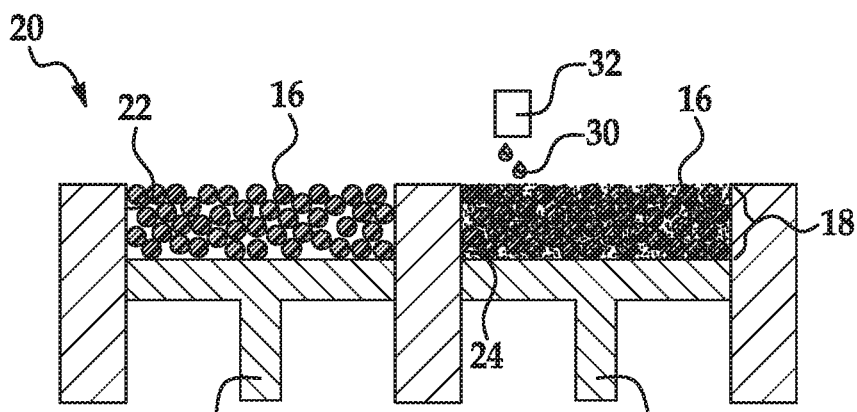

Examples of the three-dimensional (3D) printing method and the 3D printing system disclosed herein utilize Multi Jet Fusion (MJF). During multi jet fusion, an entire layer of a build material (also referred to as build material particles) is exposed to energy, but a selected portion (in some instances less than the entire layer) of the build material is fused and hardened to become a layer of a 3D part. In the examples disclosed herein, a fusing agent is selectively deposited in contact with the selected portion of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D part.

Traditionally, forming a part by MJF with a specific desired mechanical property involved the use of a build material with the desired mechanical property or the use of an additive in the build material particles. Using a specific build material or additive within the build material does not easily allow for the formation of parts with different mechanical properties in different areas or parts with gradient mechanical properties.

In the examples disclosed herein, a mechanical tailoring agent is selectively deposited on the build material and/or on the layer of the 3D object/part to impart the desired mechanical property within, and/or upon the surface of the layer of the 3D objects/parts at the voxel level. To impart the mechanical property/properties, a traditional polymeric build material may be used without modification prior to applying the polymeric build material to a fabrication bed or other support member. The mechanical tailoring agents are jettable via thermal and/or piezoelectric inkjet printheads. As such, the mechanical tailoring agents may be deposited onto the polymeric build material or fused layer to change a mechanical property of a fused layer formed of the polymeric build material, or to form a mechanical component on the fused layer, or to change a mechanical property of a subsequently formed fused layer. The mechanical tailoring agents chemically or physically bond with the polymeric build material or the fused layer, and the composition formed by chemically or physically bonding the mechanical tailoring agent(s) and polymeric build material or fused layer has a different mechanical property than the polymeric build material or the fused layer alone (i.e., not in contact with the mechanical tailoring agent).

The method(s) disclosed herein also enable control over where the mechanical property is introduced (e.g., at the voxel surface and/or through the voxel volume). By combining mechanical voxels in a controlled fashion using MJF, a variety of parts with different mechanical properties can be created. As examples, the methods disclosed herein may be used to form shoe soles, wings, medical devices, and toothbrushes, especially when different mechanical properties are desired in different portions of the part.

The mechanical property that is imparted to/on the object/part may be increased ductility (as compared to the area of the layer not in contact with the mechanical tailoring agent) or increased rigidity (as compared to the area of the layer not in contact with the mechanical tailoring agent). As used herein "increased ductility" or "greater ductility" refers to an improvement in elongation at break, toughness, resilience, elongation at yield, or elongation at maximum stress in tension, compression, shear, or torsion. As used herein, "increased rigidity" or "greater rigidity" refers to an improvement in yield strength, ultimate strength, break strength, or elastic modulus in tension, compression, shear, or torsion.

The mechanical property may be imparted upon the polymeric build material (and the portion of the 3D part formed therefrom) by selectively depositing a suitable mechanical tailoring agent on the polymeric build material. The mechanical property may also be the property of at least a portion of a mechanical component that is formed on the surface of the layer of the 3D object/part by selectively depositing a suitable mechanical tailoring agent on the layer.

It is to be understood that in the examples disclosed herein, a single mechanical property or several mechanical properties may be imparted to a single layer of polymeric build material and/or a single layer of the 3D object/part. It is also to be understood that to form a multi-layered structure in the polymeric build material or on the 3D object/part/ layer, different mechanical tailoring agents may be sequentially applied upon one another. In these types of structures, gradient mechanical properties may be formed. As an example, a first mechanical tailoring agent may be selectively applied (on at least a portion of the polymeric build material or on an area of a 3D object/part/layer) to impart a first mechanical property (e.g., rigidity) and then a second mechanical tailoring agent may be selectively applied on the first mechanical tailoring agent to impart a second mechanical property (e.g., increase rigidity as compared to the first mechanical property) that is different than the first mechanical property.

Various examples of the method are described in reference to FIGS. 1A-1C, FIGS. 1A-1E, FIGS. 4A-4C, FIGS. 4A, 4D, and 4E, and FIGS. 6A-6C. Each of the methods utilizes the mechanical tailoring agent 38.

The mechanical tailoring agent 38 includes a material that can change a mechanical property of at least a region or portion of a 3D printed layer 14, 14', 48. In some examples, the mechanical tailoring agent 38 is a plasticizer liquid that increases the ductility of the region of layer 14, 14', 48 that the plasticizer liquid is in contact with. In these examples, a plasticizer is the material that can change a mechanical property of the layer 14, 14', 48. In other examples, the mechanical tailoring agent 38 is a mechanical reinforcer liquid that increases the rigidity of the region of the 3D printed layer 14, 14', 48 that the mechanical reinforcer liquid is in contact with. In these examples, a mechanical reinforcer is the material that can change a mechanical property of the layer 14, 14', 48.

The plasticizer liquid includes at least the plasticizer. In some examples, the plasticizer liquid includes the plasticizer alone with no other components. In other examples, the plasticizer liquid includes the plasticizer and a solvent alone, or in combination with a liquid vehicle. The liquid vehicle may include surfactant(s), dispersing agent(s), antimicrobial agent(s), anti-kogation agent(s), chelating agent(s), humectant(s), water, and combinations thereof.

Some examples of suitable plasticizers include 2-pyrrolidone, dimethyl sulfoxide (DMSO), methyl 4-hydroxybenzoate, dioctyl phthalate, N-methyl-2-pyrrolidone (i.e., N-methyl-pyrrolidone), and mixtures thereof. Other examples of suitable plasticizers include N-2-hydroxyethyl-2-pyrrolidone (i.e., 1-(2-hydroxyethyl)-2-pyrrolidone), urea, ethylene carbonate, propylene carbonate, lactones, diethylene glycol, triethylene glycol, tetraethylene glycol, decalin, gamma-butyrolactone, dimethylformamide, and phenylmethanol. Some plasticizers may work better with different polymeric build materials 16. For example, 2-pyrrolidone, dimethyl sulfoxide (DMSO), methyl 4-hydroxybenzoate, and dioctyl phthalate are effective in causing polyamides, polystyrene, polycarbonate, and acrylonitrile butadiene styrene to become more ductile. For another example, N-methyl-pyrrolidone is effective in causing polystyrene, polycarbonate, and acrylonitrile butadiene styrene to become more ductile.

The plasticizer liquid increases the ductility of the region of the layer 14 by physically bonding with the polymeric build material 16 to which it is applied, for example, when the plasticizer liquid is applied to the polymeric build material 16 before fusing takes place. The plasticizer liquid may also be used to increase the ductility of a region of a subsequently formed layer (e.g., layer 40, FIG. 1E) of the polymeric build material 16, for example, when the plasticizer liquid is applied to a fused layer (e.g., layer 14) before additional polymeric build material 16 is applied on the fused layer 14. In this example, the additional polymeric build material 16 may absorb the plasticizer liquid that has been applied to the fused layer 14.

In an example, the plasticizer is present in the plasticizer liquid in an amount ranging from about 1 wt % to about to about 100 wt % based on the total wt % of the plasticizer liquid. The amount of plasticizer will depend, in part, on the type of plasticizer and the printing technique used to jet the plasticizer liquid. For example, some solvents may be printed at 100 wt % using thermal inkjet printing (e.g., DMSO), while others may be printed at 100 wt % using piezoelectric inkjet printing (e.g., 2-pyrrolidone). Alternatively, some plasticizers are printable via thermal inkjet printing and/or piezoelectric printing when present in an amount less than 100% (e.g., 80% or less). In other examples, the plasticizer is present in the plasticizer liquid in an amount ranging from about 5 wt % to about 60 wt %. In some of these examples, and the plasticizer liquid also includes at least 30 wt % water.

The amount of plasticizer in the plasticizer liquid may dictate how much of the mechanical tailoring agent 38 is dispensed on the polymeric build material 16, because the ratio of the plasticizer to the build material 16 should be sufficient to increase the ductility of the region of the layer 14, 14', 48 in contact with the plasticizer liquid.

When the plasticizer liquid includes a solvent, the solvent may be present in an amount ranging from about 5 wt % to about 95 wt % based on the total wt % of the plasticizer liquid. Examples of suitable solvents include water, 1-(2-hydroxyethyl)-2-pyrrolidone, 1,6-hexanediol, dimethyl sulfoxide (DMSO), isopropyl alcohol, ethanol, acetone, and mixtures thereof.

The mechanical reinforcer liquid includes at least the mechanical reinforcer. The mechanical reinforcer may be a filler material or a cross-linking agent. In some examples when the mechanical reinforcer is the filler material, the mechanical reinforcer liquid consists of the mechanical reinforcer, a solvent, and a dispersant. In other examples when the mechanical reinforcer is the cross-linking agent, the mechanical reinforcer liquid consists of the mechanical reinforcer and the solvent. The mechanical reinforcer liquid (including the filler material or the cross-linking agent) may include a liquid vehicle in combination with the solvent. The liquid vehicle may include surfactant(s), antimicrobial agent(s), anti-kogation agent(s), chelating agent(s), humectant(s), water, and combinations thereof.

Examples of suitable filler material mechanical reinforcers include graphene, carbon black, boron nanomaterials, boron nitride nanomaterials, carbon nanomaterials, silica nanomaterials, alumina nanomaterials, titanium dioxide nanomaterials, glass nanomaterials, montmorillonite nanomaterials, talc nanomaterials, basalt nanomaterials, silicon carbide nanomaterials, metal carbide nanomaterials, silicon nitride nanomaterials, metal nitride nanomaterials, polyaramide nanomaterials, metal nanomaterials, metal alloy nanomaterials, diamond nanomaterials, boron carbide nanomaterials, mica nanomaterials, wollastonite nanomaterials, ceramic nanomaterials, and combinations thereof. The nanomaterial(s) may include nanoparticles, nanorods, nanotubes, nanosheets, nanofibers, or nanowires where one or more dimension of the material is less than 1 micrometer (1 µm).

The previously listed filler material mechanical reinforcers are capable of physically bonding with the polymeric build materials 16. Any of these filler material mechanical reinforcers may also have monomeric or oligomeric units of the polymeric build material bonded thereto. These monomeric or oligomeric units enable much stronger physical bonds to be formed between the filler material mechanical reinforcers and the polymeric build material 16. Any of these filler material mechanical reinforcers may also have ligands attached thereto, where the ligands contain reactive groups that are capable of chemically bonding with the polymeric build material 16. Examples of these reactive groups include isocyanates, phosphines, and aldehydes.

The cross-linking agent mechanical reinforcer may be any molecule that is capable of reacting more than once with the polymer chain of the polymeric build material 16. The cross-linking agent mechanical reinforcer can cross-link polymer chains together, and thus chemically bond with the polymeric build material 16. Examples of the cross-linking agent mechanical reinforcer include isocyanates, phosphines, aldehydes, or other groups capable of reacting with an amino group or other group of the polymeric build material 16. Some specific examples include methyl isocyanate, ethyl isocyanate, toluene diisocyanate, hexamethylene diisocyanate, acetaldehyde, propanol, glutaraldehyde, or tris (hydroxymethyl) phosphine.

The amount of mechanical reinforcer in the mechanical reinforcer liquid may be sufficient to increase the rigidity of the region of the layer 14, 14', 48 in contact with the mechanical reinforcer liquid. The mechanical reinforcer liquid increases the rigidity of the region of the layer 14, 14', 48 by chemically or physically bonding with the polymeric build material 16 of the layer 14, 14', 48 (e.g., when applied before fusing) and/or may be sufficient to increase the rigidity of the layer 14, 14', 48 by forming a component 12 on the layer 14, 14', 48 (e.g., when applied after fusing). In an example, the mechanical reinforcer is present in the mechanical reinforcer liquid in an amount ranging from about 0.1 wt % to about to about 40 wt % based on the total wt % of the mechanical reinforcer liquid. In another example, the mechanical reinforcer is present in the mechanical reinforcer liquid in an amount of about 3.3 wt %.

Any of the filler material mechanical reinforcers that are present in the mechanical reinforcer liquid as solid particles (e.g., graphene, carbon black) may include a dispersing species/agent. Examples of suitable dispersing species may be polymer or small molecule dispersants, charged groups attached to the particle surface, or other suitable dispersants. The dispersing agent helps to uniformly distribute the filler material mechanical reinforcer throughout the mechanical reinforcer liquid. Some examples of suitable dispersing agents include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.) or water-soluble styrene-maleic anhydride copolymers/resins. When utilized, the dispersing agent may be present in an amount ranging from about 0.1 wt % to about 20 wt % of the total wt % of the mechanical reinforcer.

The solvent may be present in the mechanical reinforcer liquid in an amount ranging from about 10 wt % to about 99 wt % based on the total wt % of the mechanical reinforcer liquid. Examples of suitable solvents include water, 1-(2-hydroxyethyl)-2-pyrrolidone, 1,6-hexanediol, dimethyl sulfoxide (DMSO), isopropyl alcohol, ethanol, acetone, N-methyl-2-pyrrolidone, dimethyl formamide, cyclohexyl pyrrolidone, and mixtures thereof.

Surfactant(s) may be used in the mechanical tailoring agent 38 (e.g., the plasticizer liquid including the plasticizer or the mechanical reinforcer liquid including the mechanical reinforcer) to quickly wet the polymeric build material 16. As an example, the mechanical tailoring agent 38 may include non-ionic, cationic, and/or anionic surfactants, which may be present in an amount ranging from about 0.01 wt % to about 1 wt % based on the total wt % of the mechanical tailoring agent 38. In at least some examples, the mechanical tailoring agent 38 may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); CAPSTONE® FS-35 (a non-ionic fluorosurfactant from Dupont); TERGITOL® TMN-3 and TERGITOL® TMN-6 (both of which are branched secondary alcohol ethoxylate, non-ionic surfactants), TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.); DOWFAX™ 2A1 or DOWFAX™ 8390 (anionic surfactants available from The Dow Chemical Co.); and POLYFOX™ (e.g., POLYFOX™ PF-154N and other fluorosurfactants available from Omnova Solutions).

As mentioned above, mechanical tailoring agent 38 (e.g., the plasticizer liquid including the plasticizer or the mechanical reinforcer liquid including the mechanical reinforcer) may include a dispersing agent. An example of a suitable dispersant is a polyacrylic acid polymer (e.g., commercially available as CARBOSPERSE™ K-7028 Polyacrylate from Lubrizol). The amount of dispersant may range from about 0.01 wt % to about 5 wt % based on the total wt % of the mechanical tailoring agent 38.

The mechanical tailoring agent 38 (e.g., the plasticizer liquid including the plasticizer or the mechanical reinforcer liquid including the mechanical reinforcer) may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof. In an example, the mechanical tailoring agent 38 may include a total amount of antimicrobial agents that ranges from about 0.1 wt % to about 0.25 wt %.

When the mechanical tailoring agent 38 (e.g., the plasticizer liquid including the plasticizer or the mechanical reinforcer liquid including the mechanical reinforcer) is to be applied via thermal inkjet applications, an anti-kogation agent may also be included. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) and dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the mechanical tailoring agent 38 in an amount ranging from about 0.01 wt % to about 1 wt % of the total wt % of the mechanical tailoring agent 38.

The mechanical tailoring agent 38 (e.g., the plasticizer liquid including the plasticizer or the mechanical reinforcer liquid including the mechanical reinforcer) may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the mechanical tailoring agent 38 may range from 0 wt % to about 1 wt % based on the total wt % of the mechanical tailoring agent 38.

Humectant(s) may be used in the mechanical tailoring agent 38 (e.g., the plasticizer liquid including the plasticizer or the mechanical reinforcer liquid including the mechanical reinforcer). An example of a suitable humectant is LIPONIC® EG-1 (glycereth-26, available from Lipo Chemicals). The humectant may be added in an amount ranging from about 0.25 wt % to about 1 wt % based on the total wt % of the mechanical tailoring agent 38.

A pH adjusting agent may also be used to adjust the pH of the mechanical tailoring agent 38. In an example, the pH ranges from about 7.5 to about 9.0. In another example, the pH ranges from about 8.0 to about 8.5. In other examples, buffers may be used. An example of a suitable buffer is MOPS (3-(N-morpholino)propanesulfonic acid), and an example of a suitable amount of the buffer ranges from about 0.1 wt % to about 0.2 wt % based on the total wt % of the mechanical tailoring agent 38.

The balance of the mechanical tailoring agent 38 (e.g., the plasticizer liquid including the plasticizer or the mechanical reinforcer liquid including the mechanical reinforcer) is water. As such, the amount of water may vary depending upon the weight percent of the other mechanical tailoring agent components. In an example, the amount of water is at least 30 wt %. The water may be deionized water.

In some examples, the components of the liquid vehicle may be mixed together, and then mixed with the plasticizer liquid, or with water and the plasticizer liquid, or with the mechanical reinforcer liquid, or with water and the mechanical reinforcer liquid to obtain the final mechanical tailoring agent 38. In these examples, the liquid vehicle may or may not include water. When the liquid vehicle does not include water, the amount of water added as the balance of the mechanical tailoring agent 38 will depend upon the amount of plasticizer liquid or mechanical reinforcer liquid being used and the desired weight percentages for the liquid vehicle components in the final mechanical tailoring agent 38. When the liquid vehicle does include water (e.g., in an amount up to 50 wt % of the liquid vehicle), the amount of water added as the balance of the mechanical tailoring agent 38 will depend upon the amount of plasticizer liquid or mechanical reinforcer liquid being used, the amount of water present in the liquid vehicle, and the desired weight percentages for the liquid vehicle components in the final mechanical tailoring agent 38.

An example of the mechanical tailoring agent 38 when the mechanical tailoring agent 38 is the plasticizer liquid includes about 7 wt % methyl 4-hydroxybenzoate (as the plasticizer), about 46 wt % of the liquid vehicle (i.e., surfactant(s), dispersing agent(s), antimicrobial agent(s), anti-kogation agent(s), chelating agent(s), humectant(s), water, and combinations thereof), and about 46 wt % water (in addition to any water present in the liquid vehicle). Another example of the plasticizer liquid as the mechanical tailoring agent 38 includes about 40 wt % 2-pyrrolidone (as the plasticizer), about 20 wt % of the liquid vehicle, and about 40 wt % water (in addition to any water present in the liquid vehicle). Still another example of the plasticizer liquid as the mechanical tailoring agent 38 includes about 40 wt % dimethyl sulfoxide (as the plasticizer), about 20 wt % of the liquid vehicle, and about 40 wt % water (in addition to any water present in the liquid vehicle). Still another example of the plasticizer liquid as the mechanical tailoring agent 38 includes about 60 wt % 2-pyrrolidone (as the plasticizer), about 20 wt % of the liquid vehicle, and about 20 wt % water (in addition to any water present in the liquid vehicle).

An example of the mechanical tailoring agent 38 when the mechanical tailoring agent 38 is the mechanical reinforcer liquid includes about 3.3 wt % graphene (as the mechanical reinforcer), about 0.8 wt % of the dispersing agent (which may be a resin, e.g., JONCRYL® 683), about 14 wt % of the liquid vehicle, and about 80 wt % water (in addition to any water present in the liquid vehicle).

Other examples of the mechanical tailoring agent 38 (e.g., the plasticizer liquid including the plasticizer or the mechanical reinforcer liquid including the mechanical reinforcer) also include a colorant. The colorant may be any suitable pigment or dye. An example of a suitable pigment includes carbon black, which may also improve the mechanical properties of the 3D part that is formed. Examples of suitable dyes include Acid Red 52 (Acid Red 52, Na salt), Magenta 377 (M377), yellow dye Y1189-Na, Acid Yellow 17 (Acid Yellow 17, Na salt), Acid Blue 9, phthalocyanine derivatives (e.g., C.I. Direct Blue 199, which is an ammonium, lithium or sodium salt of copper phthalocyanine-sulfonic acid, C854-Na, which is a phthalocyanine dye, sodium salt), PRO-JET® cyan, magenta, and yellow products from FujiFilm Industrial Colorants, DUASYN® products from Clariant, or the like. When included, the colorant may range from about 1 wt % to about 6 wt % based on the total wt % of the the mechanical tailoring agent 38. As examples, about 5 wt % of carbon black may be included, or about 2 wt % Acid Red 52 may be included, or about 4 wt % of C.I. Direct Blue 199 may be included.

Carbon black may also function as a radiation absorber. As such, some examples of the mechanical tailoring agent 38 include the radiation absorber, which enhances the absorption of applied radiation, and therefore heats the polymeric build material 16 in contact therewith faster than when the radiation absorber is not present. Examples of other suitable radiation absorbers include those listed hereinbelow for the fusing agent 30. In these examples, the mechanical tailoring agent 38 both changes a mechanical property of the polymeric build material 16 (and thus the fused layer) and improves heating of the polymeric build material 16 by enhancing the absorption of the applied radiation. As such, in some examples, the mechanical tailoring agent 38 may also function as the fusing agent.

With the mechanical modifier (i.e., plasticizer, filler material, or cross-linking agent) and the radiation absorber both present in the mechanical tailoring agent 38, the heating potential from the absorber may be balanced with cooling provided by the remaining components of the mechanical tailoring agent 38. This effect may be coupled with the effect of a fusing agent 30 that does not include the mechanical modifier. For example, the fusing agent 30 may be applied in an amount suitable to fuse the build material 16 in contact therewith, and then the mechanical tailoring agent 38 (with both the mechanical modifier and the radiation absorber) may be added in an amount sufficient to alter the mechanical property. The radiation absorber in the mechanical tailoring agent 38 may absorb a suitable amount of radiation to compensate for any cooling resulting from the mechanical tailoring agent 38.

Yet further examples of the mechanical tailoring agent 38 (e.g., the plasticizer liquid including the plasticizer or the mechanical reinforcer liquid including the mechanical reinforcer) also include a resin. Example resins (which can also function as a dispersing agent) include any of the previously listed JONCRYL® resins, such as JONCRYL® 683 from BASF Corp. The resin may be present in an amount ranging from about 0.5 wt % to about 2 wt %. The resin may improve the jettability and/or reliability of the applicators 32, 32'. An example of this mechanical tailoring agent 38 is the plasticizer liquid including about 5 wt % dioctyl phthalate (as the plasticizer), about 1 wt % of the resin, about 20 wt % of the liquid vehicle, and about 74 wt % water (in addition to any water present in the liquid vehicle).

While not shown in FIGS. 1A-1C, FIGS. 1A-1E, FIGS. 4A-4C, FIGS. 4A, 4D, and 4E, and FIGS. 6A-6C, the method may include preparing the mechanical reinforcer liquid. In one example the mechanical reinforcer liquid may be prepared by adding the mechanical reinforcer to a milling solution to form a mixture. The milling solution may include water and a dispersing agent (e.g., JONCRYL® 683). The mixture may be milled to reduce the average particle diameter of the mechanical reinforcer and to form a dispersion. Any suitable milling technique may be used. In an example, a planetary mill may be used with 0.2 mm zirconia beads. The rotor speed of the mill may be about 700 rotations per minute. The mixture may be alternated between being milled for about 8 minutes and resting for about 22 minutes for about 25 repetitions. The dispersion may be rinsed from the beads with water. The dispersion may then be filtered with a suitably sized filter. In an example, a 1.2 µm sized filter may be used. The dispersion may then be incorporated into the liquid vehicle to form the mechanical reinforcer liquid. The dispersion may also be used as the mechanical reinforcer liquid if the solvent system of the dispersion is suitable for the printing technique to be utilized. When a colorant is included in the mechanical reinforcer liquid, it may be milled with the mechanical reinforcer, or it may be added to the liquid vehicle.

Figure 1B:
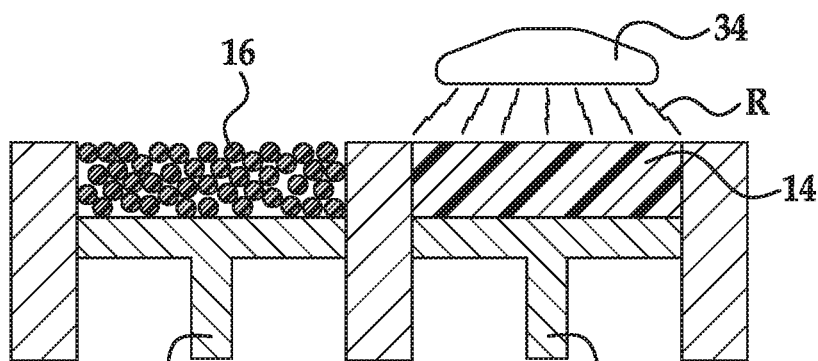
Figure 1C:
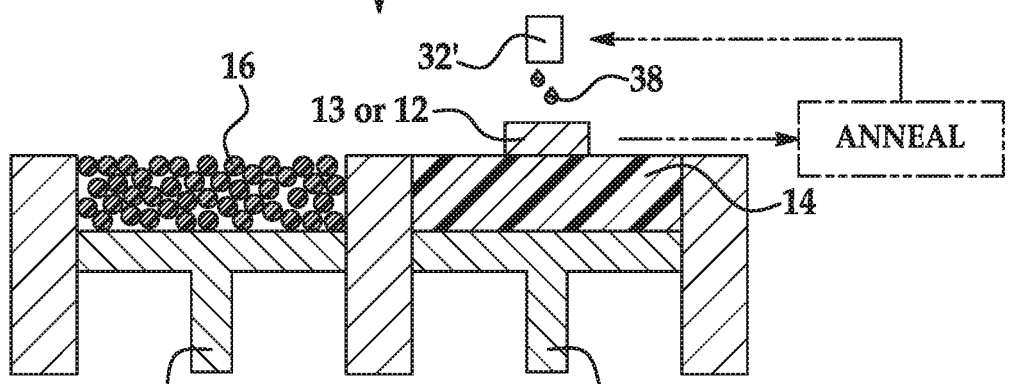

Referring now to FIGS. 1A-1C, two examples of the 3D printing method disclosed herein are depicted. As shown in FIG. 2, in one example of the method, the 3D object/part 10 that is formed includes a mechanical component or feature 12 formed on the surface of a 3D printed layer 14.

Referring now to FIG. 1A, both examples of the method includes applying a polymeric build material 16. As depicted, one layer 18 of the polymeric build material 16 has been applied, as will be discussed in more detail below.

The polymeric build material 16 may be a powder, a liquid, a paste, or a gel. Examples of the polymeric build material 16 include semi-crystalline thermoplastic materials with a wide processing window of greater than 5° C. (i.e., the temperature range between the melting point and the re-crystallization temperature). Some specific examples of the polymeric build material 16 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the polymeric build material 16 include polyethylene, polyethylene terephthalate (PET), and an amorphous variation of these materials. Still other examples of suitable polymeric build materials 16 include polystyrene, polyacetals, polypropylene, polycarbonate, polyester, acrylonitrile butadiene styrene, thermal plastic polyurethanes, other engineering plastics, other high performance plastics like polyetheretherketone (PEEK), and blends of any two or more of the polymers listed herein. Core shell polymer particles of these materials may also be used.

The polymeric build material 16 may have a melting point ranging from about 50° C. to about 400° C. As examples, the polymeric build material 16 may be a polyamide having a melting point of 180° C., or a thermal plastic polyurethane having a melting point ranging from about 100° C. to about 165° C.

The polymeric build material 16 may be made up of similarly sized particles or differently sized particles. In the examples shown herein, the polymer build material 16 includes similarly sized particles.

The term "size" or "particle size" is used herein to describe at least the polymeric build material 16. The size or particle size generally refers to the diameter or average diameter, which may vary, depending upon the morphology of the individual particle. In an example, the respective particle may have a morphology that is substantially spherical. A substantially spherical particle (i.e., spherical or near-spherical) has a sphericity of >0.84. Thus, any individual particles having a sphericity of <0.84 are considered non-spherical (irregularly shaped). The particle size of the substantially spherical particle may be provided by its largest diameter, and the particle size of a non-spherical particle may be provided by its average diameter (i.e., the average of multiple dimensions across the particle) or by an effective diameter, which is the diameter of a sphere with the same mass and density as the non-spherical particle.

In an example, the average size of the particles of the polymeric build material 16 ranges from about 1 µm to about 500 µm. In another example, the polymeric build material 16 is a particle having a particle size ranging from about 5 µm to less than 200 µm.

It is to be understood that the polymeric build material 16 may include, in addition to the polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the polymeric build material 16.

Flow aid(s) may be added to improve the coating flowability of the polymeric build material 16. Flow aid(s) may be particularly desirable when the particles of the polymeric build material 16 are less than 25 µm in size. The flow aid improves the flowability of the polymeric build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the polymeric build material 16.

In the example shown in FIG. 1A, a printing system 20 for forming the part 10 includes a supply bed 22 (including a supply of the polymeric build material 16), a delivery piston 26, a spreader (not shown), a fabrication bed 24, and a fabrication piston 28. It is to be understood that the 3D printing system 20 may include additional components and that some of the components described herein may be removed and/or modified. Furthermore, components of the printing system 20 depicted in FIGS. 1A-1E, FIGS. 4A-4E, and FIGS. 6A-6C may not be drawn to scale and thus, the printing system 20 may have a different size and/or configuration other than as shown therein.

Each of the physical elements of the printing system 20 may be operatively connected to a central processing unit (not shown) of the printing system 20 that controls the general operation of the additive printing system 20. As an example, the central processing unit may be a microprocessor-based controller that is coupled to a memory, for example via a communications bus (not shown). The memory stores computer readable instructions. The central processing unit may execute the instructions and thus may control operation of the system 20 in accordance with the instructions. The central processing unit (e.g., running the computer readable instructions stored on a non-transitory, tangible computer readable storage medium) manipulates and transforms data represented as physical (electronic) quantities within the printer's registers and memories in order to control the physical elements to create the 3D part 10. The data for the selective delivery of the polymeric build material 16, the fusing agent 30, the mechanical tailoring agent 38, etc. may be derived from a model of the part to be formed. For example, the instructions may cause the controller to utilize a build material distributor to dispense the polymeric build material 16, and to utilize applicators (e.g., an inkjet applicator) to respectively and selectively dispense the fusing agent 30 and the mechanical tailoring agent 38 to form a three-dimensional part/layer 14 having a different mechanical property in the region where the mechanical tailoring agent 38 has been applied than that of the area of the layer 14 not in contact with the mechanical tailoring agent 38.

The delivery piston 26 and the fabrication piston 28 may be the same type of piston, but are programmed to move in opposite directions. In an example, when a first layer of the 3D object is to be patterned or formed, the delivery piston 26 may be programmed to push a predetermined amount of the polymeric build material 16 out of the opening in the supply bed 22 and the fabrication piston 28 may be programmed to move in the opposite direction of the delivery piston 26 in order to increase the depth of the fabrication bed 24. The delivery piston 26 will advance enough so that when the spreader pushes the build material 16 into the fabrication bed 24, the depth of the fabrication bed 24 is sufficient so that a layer 18 of the build material 16 may be formed in the bed 24. The spreader is capable of spreading the build material 16 into the fabrication bed 24 to form the layer 18, which is relatively uniform in thickness. In an example, the thickness of the layer 18 ranges from about 90 µm to about 110 µm, although thinner or thicker layers may also be used. For example, the thickness of the layer 18 may range from about 50 µm to about 1 mm. In an example, the layer 18 thickness ranges from about 100 µm to about 200 µm.

It is to be understood that the spreader is a build material distributor. The build material distributor may be a roller, a rigid or flexible blade (e.g., a doctor blade), a brush, a combination of a roller and/or a blade and/or a brush, and/or any other device that is capable of spreading different types of powders.

The supply bed 22 that is shown is one example, and could be replaced with another suitable delivery system to supply the polymeric build material 16 to the fabrication bed 24. Examples of other suitable delivery systems include a hopper, an auger conveyer, or the like.

The fabrication bed 24 that is shown is also one example, and could be replaced with another support member, such as a platen, a print bed, a glass plate, or another build surface. Like the fabrication bed 24 and the delivery piston 26, these other support members may be lowered in precise increments in order to receive the polymeric build material 12 in a desirable thickness.

After the layer 18 of the polymeric build material 16 is applied in the fabrication bed 24, the layer 18 may be exposed to pre-heating (not shown). Pre-heating may be performed to pre-heat the polymeric build material 16 (before fusing takes place), and thus the pre-heating temperature may be below the melting point of the polymeric build material 16. As such, the pre-heating temperature selected will depend upon the polymeric build material 16 that is used. As examples, the pre-heating temperature may be from about 5° C. to about 100° C. below the melting point of the polymeric build material 16.

Pre-heating the layer 18 of the polymeric build material 16 may be accomplished using any suitable heat source that exposes all of the polymeric build material 16 in the fabrication bed 24 to the heat. Examples of the heat source include a thermal heat source or an electromagnetic radiation source (e.g., infrared (IR), microwave, ultraviolet, etc.).

As shown in FIG. 1A, the method also includes selectively applying the fusing agent 30 on at least a portion of the polymeric build material 16. The fusing agent 30 may be dispensed from any suitable applicator 32. An example of the applicator 32 is an inkjet printhead, such as a thermal inkjet printhead or a piezoelectric inkjet printhead. The printhead 32 may be a drop-on-demand printhead or a continuous drop printhead. The applicator 32 may be selected to deliver drops of the fusing agent 30 at a resolution ranging from about 300 dots per inch (DPI) to about 1200 DPI. In other examples, the applicator 32 may be selected to be able to deliver drops of the fusing agent 30 at a higher or lower resolution. The drop velocity may range from about 5 m/s to about 24 m/s and the firing frequency may range from about 1 kHz to about 100 kHz.

The applicator 32 may include an array of nozzles through which it is able to selectively eject drops of fluid. In one example, each drop may be in the order of about 10 pico liters (pl) per drop, although it is contemplated that a higher or lower drop size may be used. In some examples, applicator 32 is able to deliver variable size drops of the fusing agent 30.

The applicator 32 may be attached to a moving XY stage or a translational carriage (neither of which is shown) that moves the applicator 32 adjacent to the fabrication bed 24 in order to deposit the fusing agent 30 in desirable area(s). In other examples, the applicator 32 may be fixed while a support member (similar to the fabrication bed 24) is configured to move relative thereto. The applicator 32 may be programmed to receive commands from a central processing unit and to deposit the fusing agent 30 according to a pattern of a cross-section for the layer of the 3D object/part that is to be formed. As used herein, the cross-section of the layer of the part to be formed refers to the cross-section that is parallel to a contact surface of the fabrication bed 24.

In an example, the applicator 32 may have a length that enables it to span the whole width of the fabrication bed 24 in a page-wide array configuration. As used herein, the term 'width' generally denotes the shortest dimension in the plane parallel to the X and Y axes of the contact surface, and the term 'length' denotes the longest dimension in this plane. However, it is to be understood that in other examples, the term 'width' may be interchangeable with the term 'length'.

In an example, the page-wide array configuration is achieved through a suitable arrangement of multiple applicators 32. This configuration may be desirable for single pass printing. In still other examples of the printing system 20, the applicator(s) 32 may have a shorter length that does not enable it/them to span the whole width of the fabrication bed 24. In these other examples, the applicator(s) 32 may be movable bi-directionally across the width of the fabrication bed 24. This configuration enables selective delivery of the fusing agent 30 across the whole width and length of the fabrication bed 24 using multiple passes.

Examples of the fusing agent 30 are water-based dispersions including a radiation absorbing binding agent (i.e., an active material).

One example of a suitable active material is PEDOT:PSS (poly(3,4-ethylenedioxythiophene) polystyrene sulfonate).

The active material may also be any electromagnetic radiation absorbing colorant. In an example, the active material is a near infrared light absorber. Any near infrared colorants, e.g., those produced by Fabricolor, Eastman Kodak, or Yamamoto, may be used in the fusing agent 30. As one example, the fusing agent 30 may be an ink formulation including carbon black as the active material. Examples of this ink formulation are commercially known as CM997A, 516458, C18928, C93848, C93808, or the like, all of which are available from HP Inc.

As another example, the fusing agent 30 may be an ink formulation including near infrared absorbing dyes as the active material. Examples of this ink formulation are described in U.S. Pat. No. 9,133,344, incorporated herein by reference in its entirety. Some examples of the near infrared absorbing dye are water soluble near infrared absorbing dyes selected from the group consisting of:

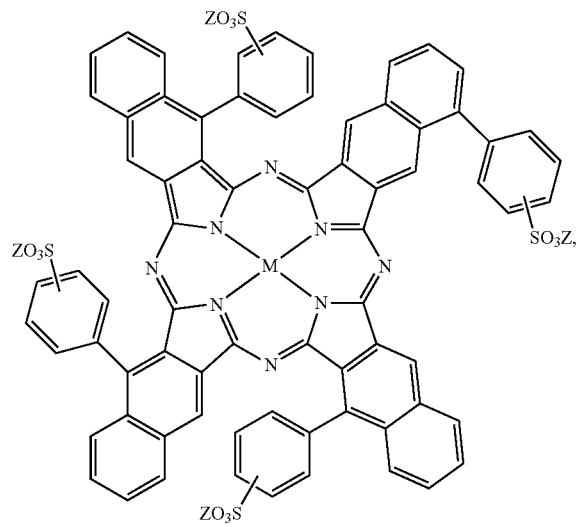

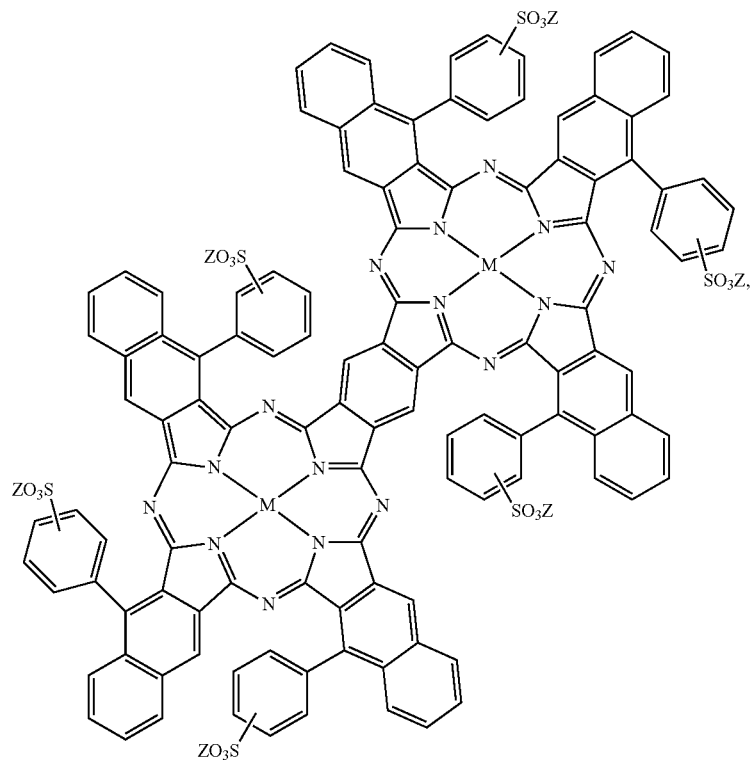
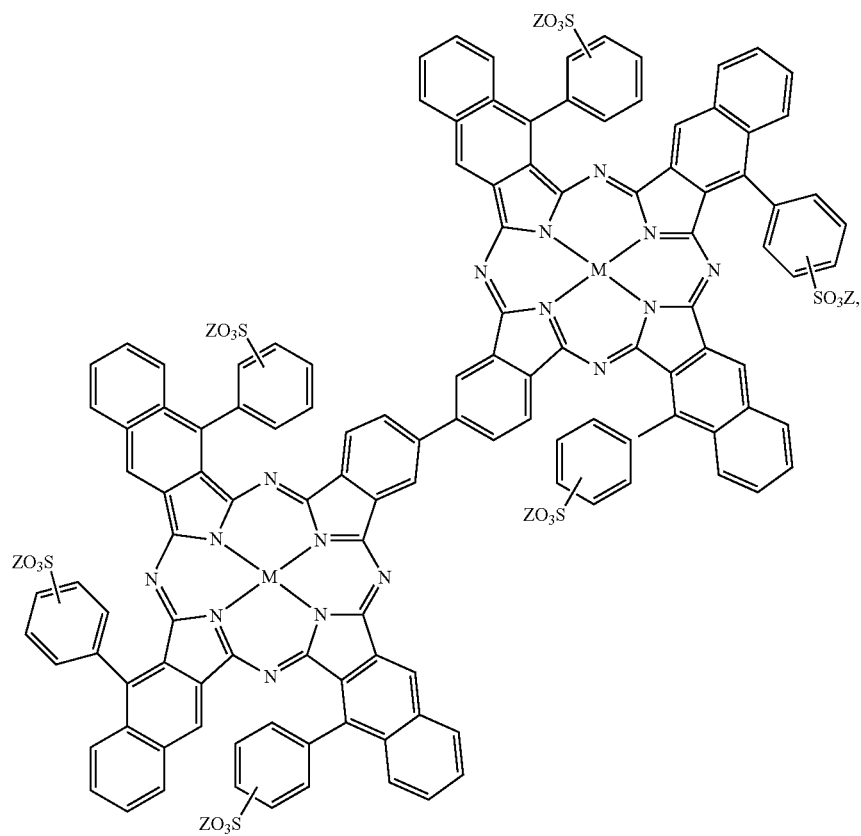

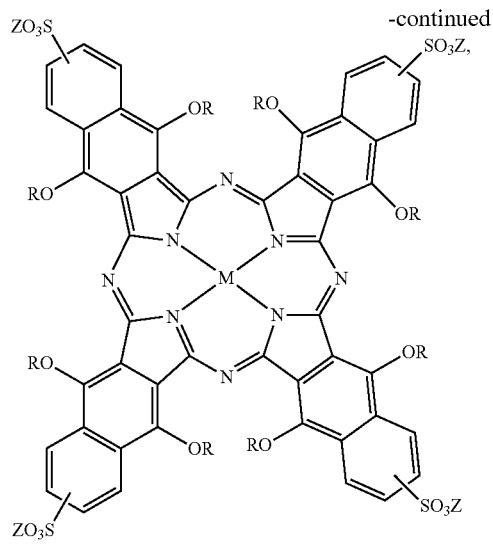

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near infrared absorbing dye is neutral. For example, the counterion can be sodium, lithium, potassium, $NH_4^+$, etc.

Some other examples of the near infrared absorbing dye are hydrophobic near infrared absorbing dyes selected from the group consisting of:

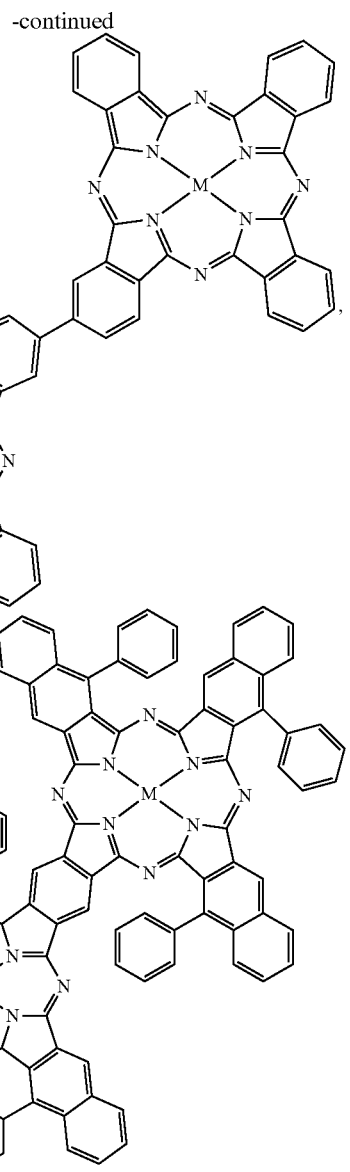

and mixtures thereof. For the hydrophobic near infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valences if the metal is more than divalent, and R can be any C1-C8 alkyl group (including substituted alkyl and unsubstituted alkyl).

The amount of the active material that is present in the fusing agent 30 ranges from greater than 0 wt % to about 40 wt % based on the total wt % of the fusing agent 30. In other examples, the amount of the active material in the fusing agent 30 ranges from about 0.3 wt % to 30 wt %, or from about 1 wt % to about 20 wt %. It is believed that these active material loadings provide a balance between the fusing agent 30 having jetting reliability and heat and/or electromagnetic radiation absorbance efficiency.

The aqueous nature of the fusing agent 30 enables the fusing agent 30 to penetrate, at least partially, into the layer 18 of the polymeric build material 16. The polymeric build material 16 may be hydrophobic, and the presence of a co-solvent and/or a surfactant in the fusing agent 30 may assist in obtaining a particular wetting behavior.

As shown in FIG. 1B, after the fusing agent 30 is selectively applied in the specific portion(s) of the layer 18, the entire layer 18 of the build material 16 is exposed to radiation R.

In an example, the electromagnetic radiation R may include wavelengths ranging from about 100 nm (UV) to about 10 µm. In yet another example, the electromagnetic radiation R wavelengths range from about 400 nm to about 3 µm or 4 µm (which includes near-infrared and mid-infrared radiation). As an example, the electromagnetic radiation 36 is blackbody radiation with a maximum intensity at a wavelength of about 1100 nm.

The radiation R is emitted from a radiation source 34, such as an IR (e.g., near-IR) curing lamp, a UV or UV-Vis curing lamp, IR (e.g., near-IR), UV, or visible light emitting diodes (LED), Vertical Cavity Surface Emitting Laser (VCSEL) arrays, flash-lamp, or lasers with specific wavelengths. Any radiation source 34 may be used that emits a suitable wavelength for the 3D printing process. The radiation source 34 may be attached, for example, to a carriage that also holds the applicator(s) 32. The carriage may move the radiation source 34 into a position that is adjacent to the fabrication bed 24. The radiation source 34 may be programmed to receive commands from the central processing unit and to expose the layer 18, including the fusing agent 30 and polymeric build material 16, to radiation R.

The length of time the radiation R is applied for, or energy exposure time, may be dependent, for example, on one or more of: characteristics of the radiation source 34; characteristics of the polymeric build material 16; and/or characteristics of the fusing agent 30.

The fusing agent 30 enhances the absorption of the radiation R, converts the absorbed radiation to thermal energy, and promotes the transfer of the thermal heat to the polymeric build material 16 in contact therewith. In an example, the fusing agent 30 sufficiently elevates the temperature of the polymeric build material 16 above the melting point(s), allowing curing (e.g., sintering, binding, fusing, etc.) of the polymeric build material particles to take place. Exposure to radiation R forms a layer 14 of the 3D object/part 10.

While not shown in FIG. 1B, it is to be understood that portions of the polymeric build material 16 that do not have the fusing agent 30 applied thereto do not absorb enough energy to fuse. Any unfused polymeric build material 16 may be removed from the layer 14 that is formed.

As shown in FIG. 1C, the method also includes selectively applying the mechanical tailoring agent 38 on at least a portion of the layer 14.

In one example shown in FIG. 1C, the mechanical tailoring agent 38 may be used to form a mechanical component 12 on the surface of the layer 14. In this example, the mechanical tailoring agent 38 may be the mechanical reinforcer liquid including the filler material mechanical reinforcer. The filler material mechanical reinforcer forms the mechanical component 12. In this example, the mechanical property of the layer 14 may be different from the mechanical property of the mechanical component 12 that is formed.

In another example shown in FIG. 1C, the mechanical tailoring agent 38 may be used to prepare the surface of the layer 14 for subsequently applied build material 16, which will absorb the applied mechanical tailoring agent 13. In this example, the subsequently applied build material 16 that absorbs the applied mechanical tailoring agent 13 will have an altered mechanical property compared to the subsequently applied build material 16 that does not absorb the applied mechanical tailoring agent 13. In turn, the part portion 40" (see FIG. 1E, also referred to as a composite layer) formed from the fused build material 16 that has absorbed the applied mechanical tailoring agent 13 will have an altered mechanical property compared to the part portion 40 formed from the fused build material 16 that had not absorbed the applied mechanical tailoring agent 13. In this example of the method, the mechanical tailoring agent 38 may be the plasticizer liquid, which increases the ductility of the part portion 40", or the mechanical tailoring agent 38 may be the mechanical reinforcer liquid including the cross-linking agent, which increases the rigidity of the region of the part portion 40".

The mechanical tailoring agent 38 may be dispensed from any suitable applicator, such as an inkjet printhead 32' (e.g., a thermal inkjet printhead or a piezoelectric inkjet printhead), similar to inkjet printhead 32. As shown in FIG. 1C, the mechanical tailoring agent 38 may be applied on the surface of the layer 14 to form the mechanical component 12, or to prepare the surface of the layer 14 with applied mechanical tailoring agent 13, which will be absorbed by subsequently applied build material 16 (shown in FIG. 1D).

The amount of mechanical tailoring agent 38 that is dispensed by the inkjet applicator 32' onto the layer 14 is sufficient to form the mechanical component 12 or is sufficient to be absorbed by subsequently applied build material 16. The amount that is dispensed may depend on the material (e.g., the filler material mechanical reinforcer, the plasticizer, or the cross-linking agent mechanical reinforcer) used in the mechanical tailoring agent 38, the mass loading of the material used, and the polymeric build material 16 used.

After the mechanical tailoring agent 38 is selectively applied, it may be exposed to a subsequent treatment, such as annealing (as shown in phantom in FIG. 1C) or a chemical treatment (not shown) to form the mechanical component 12. In other examples, no subsequent treatment is performed. No subsequent treatment may be performed when the applied mechanical tailoring agent 13 is to be absorbed by subsequently applied build material 16.

Annealing may be used to accelerate evaporation of the aqueous formulation of the mechanical tailoring agent 38 and/or to enhance the mechanical property. As described above, some mechanical tailoring agents 38 have an aqueous formulation. It is to be understood that some mechanical tailoring agents 38 have an aqueous formulation that evaporates upon being dispensed or by the heat of the fabrication bed 24, and also do not require mechanical property enhancement, and thus the treatment may not be performed with all of the mechanical tailoring agents 38. However, even in the instances where the aqueous formulation will evaporate upon being dispensed or by the heat of the fabrication bed 24, and mechanical property enhancement is not required, annealing may be performed in order to accelerate the evaporation process.

Annealing may be accomplished utilizing the radiation source 34, another overhead annealing lamp, and/or a heater (not shown) of the fabrication bed 24 that is used to pre-heat the polymeric build material 16. The additional annealing lamp may be mounted to printing system 20, for example, with the radiation source 34 and/or upon the printing carriage. The additional annealing lamp may be an arc-lamp, a flash lamp, UV lamp, or the like. The layer 14 and the mechanical tailoring agent 38 thereon may be exposed to annealing in the fabrication bed 24, or the printing system 20 may include an additional bed or platform where annealing takes place.

Annealing takes place for a specified time and at a specified energy output determined, at least in part, by the liquid vehicle and/or bonding conditions for the material (e.g., the filler material mechanical reinforcer) used in the mechanical tailoring agent 38. Annealing may take place at a temperature below the melting temperature of the polymeric build material 16, but at a temperature that is suitable to evaporate the aqueous formulation (water, co-solvent, and in some instances surfactant), or to enhance mechanical property. Annealing may also take place at a temperature at or above the melting temperature of the polymeric build material 16 (which may range from about 50° C. to about 400° C. depending upon the polymeric build material 16). At temperatures higher than the melting temperature of the polymeric build material 16, the layer 14 may melt, which is acceptable. Following this type of higher temperature anneal, a delay in the print process can be employed to allow for the layer/part 14 to cool before additional polymeric build material 16 is supplied for the next layer. In other instances, the temperature rise may be quick, which is useful to cause annealing but leaves the layer 14 largely unaffected (in terms of exhibiting a similar temperature rise).

The thickness of the mechanical component 12 or the applied mechanical tailoring agent 13 may be built up by applying more of the mechanical tailoring agent 38 on the mechanical component 12 or on the previously applied mechanical tailoring agent 13. In some instances, after each application of the mechanical tailoring agent 38, the mechanical tailoring agent 38 may be exposed to annealing. These processes may be repeated until a desirable thickness of the mechanical component 12 or the applied mechanical tailoring agent 13 is achieved. If annealing is not desired or required, the deposited mechanical tailoring agent 38 (which forms the mechanical component 12) may be allowed to dry before a subsequent layer of the mechanical tailoring agent 38 is selectively applied thereon. The mechanical tailoring agent 38 may also be deposited layer by layer until a suitable thickness is achieved, and a single annealing step (if desired or required) may be performed. In an example, the mechanical tailoring agent 38 may be applied in an amount ranging from about 0.1 picoliters to about 36 picoliters per pixel at 600 dots per inch.

While FIG. 1C illustrates the selective application of one mechanical tailoring agent 38, it is to be understood that several (e.g., two, three, four, etc.) different mechanical tailoring agents 38 may be selectively applied to different areas of the layer 14 to form different portions of the mechanical component 12 or to prepare the surface differently for the subsequently applied build material 16. Also, several different mechanical tailoring agents 38 may also be selectively applied to the same area of the layer 14 to form at least a portion of the mechanical component 12 or to prepare the surface for the subsequently applied build material 16. The use of several different mechanical tailoring agents 38 in the same area may enhance the mechanical properties of the mechanical component 12 or the part portion 40" formed of the build material 16 that absorbs the applied mechanical tailoring agents 13.

An example of the part 10, including the 3D printed layer 14 and mechanical component 12 formed thereon, is shown in FIG. 2. The mechanical component 12 shown in FIG. 2 may be referred to as a "horizontal feature," in part because it is printed on the top most (or horizontal) surfaces of voxels of the layer 14.

In some examples of the method, the mechanical component 12 may be at least partially embedded in another layer of the 3D object/part. An example of this is shown in FIGS. 1D and 1E. This example method shown in FIGS. 1D and 1E at least partially embeds the mechanical component 12 in the additional layer/part portion 40 (shown in FIG. 1E). An example of the resulting part 10' is shown in FIG. 3A.

In other examples of the method, the applied mechanical tailoring agent 13 (formed from the plasticizer liquid or the mechanical reinforcer liquid including the cross-linking agent) may have a subsequent layer 18' of build material 16 applied thereto. At least some of the build material 16 absorbs the applied mechanical tailoring agent 13 to form a pre-composite layer 42 (i.e., build material 16 that is exposed to the mechanical tailoring agent 38), which ultimately forms a part portion 40" (or composite layer) having a modified mechanical property. An example of this is also shown in FIGS. 1D and 1E. This example method shown in FIGS. 1D and 1E changes the mechanical property of at least a portion 40" of the additional layer/part portion 40 that is formed (shown in FIG. 1E). An example of the resulting part 10' is shown in FIG. 3A.

As shown in FIG. 1D, an additional layer 18' of the polymeric build material 16 is applied on the layer 14 and on the mechanical component 12 or the applied mechanical tailoring agent 13. In the latter instance, at least some of the polymeric build material 16 absorbs the applied mechanical tailoring agent 13 to form the pre-composite layer 42. While the pre-composite layer 42 is formed in a portion of the thickness of the build material layer 18', it is to be understood that the amount of the applied mechanical tailoring agent 13 may be sufficient so that it is absorbed through the entire thickness of the build material layer 18' (which may form a part 10" similar to that shown in FIG. 3B). The additional layer 18' may be added in a similar manner as the layer 18 (described in FIG. 1A). The fusing agent 30 may then be selectively applied to the additional layer 18' of polymeric build material 16 anywhere that the additional layer 18' is to be fused. As shown in FIG. 1D, the fusing agent 30 is applied over all of the polymeric build material 16 in the additional layer 18'. The fusing agent 30 could also be selectively applied so that a portion of the polymeric build material 16 does not fuse. In some examples of the method, the pre-composite layer 42 may also be exposed to the fusing agent 30.

In one example shown in FIG. 1E, the additional layer 18' and fusing agent 30 are exposed to the radiation R, which fuses the polymeric build material 16 (in the additional layer 18' and in contact with the fusing agent 30) to form the layer 40 around the mechanical component 12.

In another example shown in FIG. 1E, the additional layer 18', the pre-composite layer 42, and the fusing agent 30 are exposed to the radiation R, which fuses the polymeric build material 16 (both i) in the additional layer 18' and in contact with the fusing agent 30 and ii) in the pre-composite layer 42 and, in some instances, in contact with the fusing agent 30) to form the part portions 40 and 40" (where 40" is a composite layer within the layer 40).

It is to be understood that heat absorbed, during the application of energy, by the polymeric build material 16 in the additional layer 18' on which fusing agent 30 has been delivered or has penetrated and/or in the pre-composite layer 42 may propagate to a previously solidified layer, such as layer 14, causing at least some of that layer 14 to heat up above its melting point. This effect helps create strong interlayer bonding between adjacent layers/portions 14, 40, or 14, 40 and 14, 40" of the part 10'.

Rather than covering the mechanical component 12 and the exposed surfaces of the layer 14 with additional polymeric build material 16 (as shown in FIG. 1D), the polymeric build material 16 may be delivered to the exposed surface(s) of the layer 14 and adjacent to the side(s) of the mechanical component 12, but not over the mechanical component 12. This forms an additional layer 18' of the polymeric build material 16 that does not completely cover the mechanical component 12 (i.e., the top surface of the mechanical component 12 remains exposed). The fusing agent 30 may then be selectively applied to the additional layer 18' of the polymeric build material 16 anywhere that the additional layer 18' is to be fused. The additional layer 18' and fusing agent 30 are exposed to the radiation R, which fuses the polymeric build material 16 (in the additional layer 18' and in contact with the fusing agent 30). An example of the layer 40' and the part 10" formed via this example of the method is shown in FIG. 3B. The layer 40' surrounds two sides of the mechanical component 12, but does not completely encapsulate the mechanical component 12.

It is to be understood that the applied mechanical tailoring agent 13 may be sufficient to absorb through the entire thickness of the layer 18' of the the polymeric build material 16. In this example, the surface of the pre-composite layer 42 would be exposed. The fusing agent 30 may then be selectively applied to the additional layer 18' of the polymeric build material 16 (including in the pre-composite layer 42) anywhere that the additional layer 18' is to be fused. The additional layer 18' (including the pre-composite layer 42) and fusing agent 30 are exposed to the radiation R, which fuses the polymeric build material 16. An example of the layer 40' and the part 10" formed via this example of the method is shown in FIG. 3B. The layer 40' surrounds two sides of the part portion 40", which is a composite layer that has an altered/changed mechanical property.

As an example, the mechanical tailoring agent 38 may be used to form a mesh or mechanical reinforced matrix within the 3D part 10. The mechanical tailoring agent 38 including the filler material mechanical reinforcer may be applied in a pattern of spaced lines (or horizontal features) on each layer that alternates between traveling the length and traveling the width of the layer (e.g., layer 14) so that mechanical components 12 in a pattern of spaced lines exists between each layer.

Figure 4A:
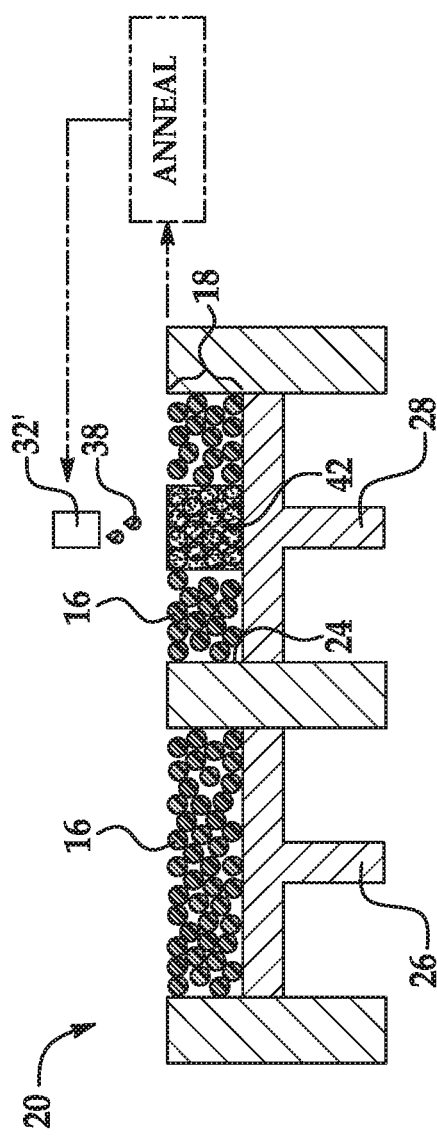

Referring now to FIGS. 4A-4C and 4A, 4D and 4E, two other examples of the 3D printing method are shown. As shown in FIG. 4A, the methods include applying the polymeric build material 16. As depicted, one layer 18 of the polymeric build material 16 has been applied. The polymeric build material 16 may be applied using the printing system 20. The polymeric build material 16 may also be pre-heated in the fabrication bed 24.

Also as shown in FIG. 4A, the mechanical tailoring agent 38 is selectively applied on at least a region of the portion (upon which the fusing agent 30 is applied) of the polymeric build material 16. Any of the mechanical tailoring agents 38 previously described may be applied, depending upon the mechanical property/feature 12' that is to be imparted (see FIGS. 4C and 4E). A single mechanical tailoring agent 38 may be applied in a suitable pattern to impart a mechanical feature 12' to at least a portion of a 3D part/layer 14' that is to be formed, or two or more mechanical tailoring agents 38 may be applied in different patterns to impart different mechanical features 12' to different portions of the 3D part/layer 14' that is to be formed.

The application of the mechanical tailoring agent(s) 38 forms a pre-composite layer 42 (i.e., build material 16 that is exposed to the mechanical tailoring agent 38), which ultimately forms area(s) C (or a composite portion/layer) of the 3D printed layer 14' having the mechanical property that is different than the mechanical property of the area(s) A, B that are not in contact with the mechanical tailoring agent 38. The pre-composite layer 42 may be fused to form all of the layer 14' or less than all of the layer 14'. The pre-composite layer 42 is fused to form all of the layer 14' when there is no area of the build material 16 that is not in contact with the mechanical tailoring agent 38. In this example, the mechanical feature 12' is imparted to the entire 3D layer 14' that is formed. The pre-composite layer 42 makes up less than all of the layer 14' when there is an area of the build material 16 that is not in contact with the mechanical tailoring agent 38. In this example, the mechanical feature 12' is imparted to only a portion of the 3D layer 14' that is formed. In the example shown at FIGS. 4A-4E, the pre-composite layer 42 is formed in part of the build material layer 18, and thus the mechanical feature/property 12' is imparted to, or makes up less than all of the layer 14'.

The mechanical tailoring agent(s) 38 may be applied in a single pass or in multiple passes using the printhead applicator 32'. The thickness of the pre-composite layer 42 may be increased as more mechanical tailoring agent(s) 38 is applied. In an example, the mechanical tailoring agent 38 may be applied in an amount up to about 200 picoliters per pixel at 600 dots per inch and with a composite layer thickness of up to about 100 μm.

After each pass, or after the desired amount of the mechanical tailoring agent 38 is applied to the polymeric build material 16, the polymeric build material 16 and the mechanical tailoring agent 38 may be exposed to a treatment (e.g., annealing, chemical treatment, etc.) to accelerate evaporation of the aqueous formulation (in instances when the mechanical tailoring agent 38 has an aqueous formulation) and/or to enhance the mechanical property. As mentioned above, it is to be understood that some mechanical tailoring agents 38 have an aqueous formulation that evaporates upon being dispensed, and also do not require mechanical property enhancement, and thus the treatment may not be performed with all of the mechanical tailoring agents 38. Annealing takes place at any suitable temperature, determined, at least in part, by the liquid vehicle and/or bonding conditions for the material (e.g., the plasticizer or the mechanical reinforcer) used in the mechanical tailoring agent 38.

It is believed that multiple passes of fusing agent 30 and mechanical tailoring agent 38 application and curing (before a final fuse of instead of a single fusing step) may help balance heating (enhanced by the fusing agent 30) and cooling (enhanced by the mechanical tailoring agent 38) over several passes so that there is not too much cooling of the layer being processed in any single pass. Too much cooling can result in layer/part warpage and 3D print failure.

In some examples, the mechanical tailoring agent 38 occupies such a small space that there is little polymeric build material 16 within the volume of the mechanical tailoring agent 38. In other examples, the mechanical tailoring agent 38 occupies enough space that there is a significant amount of polymeric build material 16 within the volume. In the example shown in FIG. 4A, the pre-composite layer 42 extends through the thickness of the polymeric build material layer 18.

The mechanical tailoring agent 38 is capable of physically or chemically bonding with the polymer build material 16 in contact therewith (in some instances in response to fusing), which imparts the mechanical feature/property 12' to the composite portion(s) of the 3D part/layer 14' formed therefrom.

Figure 4B:
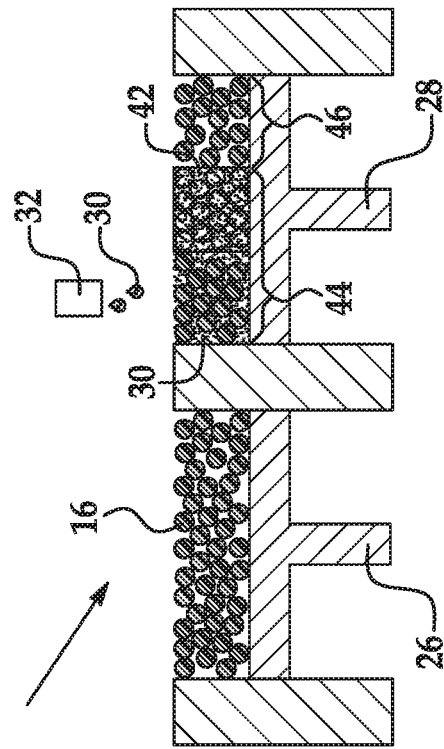
Figure 4D:
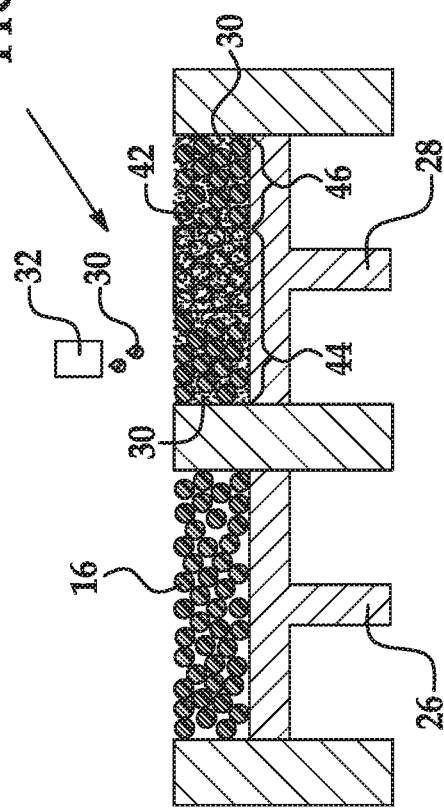

As shown in both FIGS. 4B and 4D, the fusing agent 30 is selectively applied on at least a portion(s) 44, 46 of the polymeric build material 16. Any of the previously described fusing agents 30 may be used, and the fusing agent 30 may be selectively applied using the applicator 32. In the example shown in FIG. 4B, the fusing agent 30 is selectively applied to all of the polymeric build material 16 (in both portions 44 and 46). In the example shown in FIG. 4D, the fusing agent 30 is selectively applied to the portion 44 of the polymeric build material 16, while the portion 46 of the polymeric build material 16 remains untreated. It is to be understood that the fusing agent 30 may be applied in any suitable pattern on the portion(s) 44, 46.

In the examples shown in FIGS. 4A, 4B, and 4D, the mechanical tailoring agent 38 is applied separate from and prior to the application of the fusing agent 30. It is to be understood that the fusing agent 30 may be applied separate from and prior to the application of the mechanical tailoring agent 38.

It is also to be understood that the mechanical tailoring agent 38 and the fusing agent 30 may be applied together, either simultaneously as separate agents 38, 30 or as single agent. As mentioned above, the material (e.g., the plasticizer or the mechanical reinforcer (i.e., filler material or cross-linking agent)) of the mechanical tailoring agent 38 and the radiation absorbing agent of the fusing agent 30 may be combined in the same liquid formulation and dispensed by a single applicator 32, 32'. The mechanical tailoring agent 38 and the fusing agent 30 may be applied together when the pre-composite layer 42 is to be fused to form all or a portion of the layer 14' (i.e., the mechanical feature/property 12' is to be imparted to the entire layer 14' or a portion of the entire layer 14'). The mechanical tailoring agent 38 and the fusing agent 30 may also be applied together (at certain areas) so that the additional cooling effect of the mechanical tailoring agent 38 may be balanced with the correct amount of radiation absorbing agent.

As shown in both FIGS. 4C and 4E, after the fusing agent 30 is selectively applied in the specific portion(s) 44 and/or 46, the entire layer 18 of the polymeric build material 16 is exposed to radiation R. The radiation R is emitted from the radiation source 34, which may be any of the example radiation sources described herein. The fusing agent 30 enhances the absorption of the radiation R, converts the absorbed radiation to thermal energy, and promotes the transfer of the thermal heat to the polymeric build material 16 in contact therewith. In an example, the fusing agent 30 sufficiently elevates the temperature of the polymeric build material 16 above the melting point(s), allowing curing (e.g., sintering, binding, fusing, etc.) of the polymeric build material particles 16 to take place.

When the mechanical tailoring agent 38 and the fusing agent 30 are applied separately and the pre-composite layer 42 makes up less than all of the build material layer 18 (and thus forms less than all of the layer 14'), a greater amount of the fusing agent 30 may be applied on the pre-composite layer 42 than on the remaining region of the portion(s) 44, 46. This may be done when the mechanical tailoring agent 38 does not include a radiation absorber. When the mechanical tailoring agent 38 does not include a radiation absorber, the mechanical tailoring agent 38 may provide an additional cooling effect (as compared to the cooling effect experience by the remaining region of the portion(s) 44, 46 without the mechanical tailoring agent 38 applied thereto) without any additional thermal energy converted from the radiation R. To counteract the additional cooling effect, additional fusing agent 30 may be applied to the pre-composite layer 42. The additional fusing agent 30 may supply additional thermal energy to the pre-composite layer 42 by converting additional radiation R to thermal energy. The additional thermal energy counteracts the additional cooling effect.

Exposure to radiation R forms a layer 14' of the 3D object/part. In the example shown in FIGS. 4C and 5A, the layer 14' includes fused portions A, B, which have not been exposed to the mechanical tailoring agent 38, and also includes fused portion/composite layer C (formed from the pre-composite layer 42), which exhibits the mechanical property/feature 12' imparted by the mechanical tailoring agent 38. As shown in FIGS. 4C and 5A, the fused portions A, B of the layer 14' which have not been exposed to the mechanical tailoring agent 38 surround the vertical surface(s) $V_S$ of the portion C having the mechanical property/feature 12', while the top surface of the portion C remains exposed. The mechanical property/feature 12' shown in FIG. 5A may be referred to as an "embedded vertical feature," in part because it is printed within the volume of the voxels of the polymeric build material 16 and the vertical surface $V_S$ of the portion C are not exposed in the final part/layer 14'. In the example shown in FIGS. 4E and 5B, the portion A of the layer 14' surrounds some of the vertical surface(s) $V_S$ of the portion C exhibiting the mechanical property/feature 12' while some other of the vertical surface(s) $V_S$ of the portion C and the top surface remain exposed. The mechanical property/feature 12' shown in FIG. 5B may be referred to as a "surface vertical feature," in part because it is printed within the volume of the voxels of the polymeric build material 16 and a portion of the vertical surface $V_S$ of the portion C having the mechanical property/feature 12' is exposed in the final part/layer 14'.

Referring back briefly to FIG. 4E, the portion 46 of the polymeric build material 16 that does not have the fusing agent 30 applied thereto does not absorb enough energy to fuse. Any unfused polymeric build material 16 may be removed from the layer 14' that is formed. It is to be understood that if any unfused polymeric build material 16 remains in the fabrication bed 24 in FIG. 4C, it can also be removed from the layer 14' that is formed.

Figure 6A:
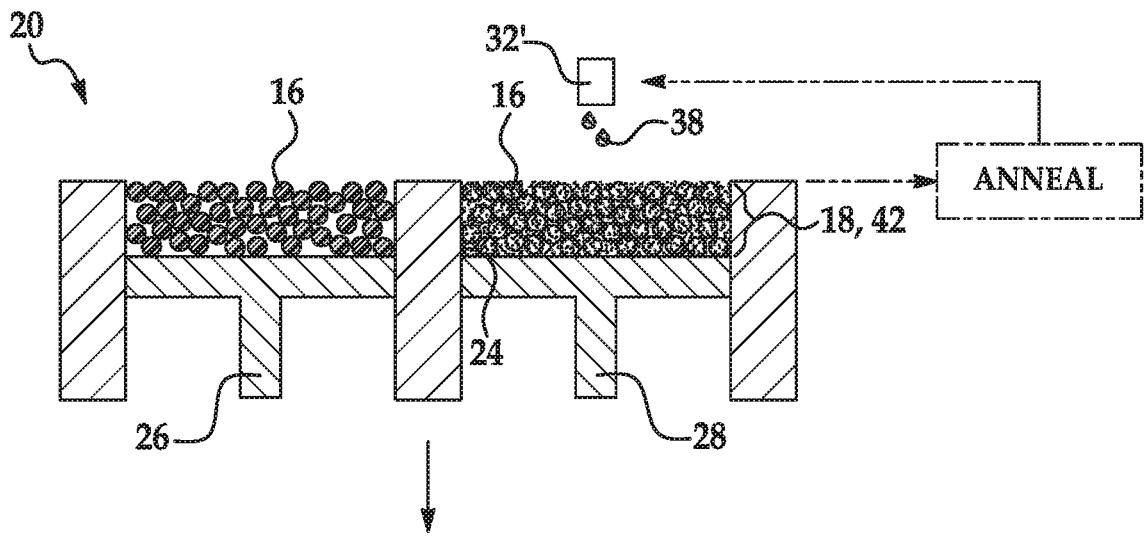
FIGS. 6A through 6C are semi-schematic, cross-sectional views depicting another example of the 3D printing method disclosed herein.
Figure 6B:
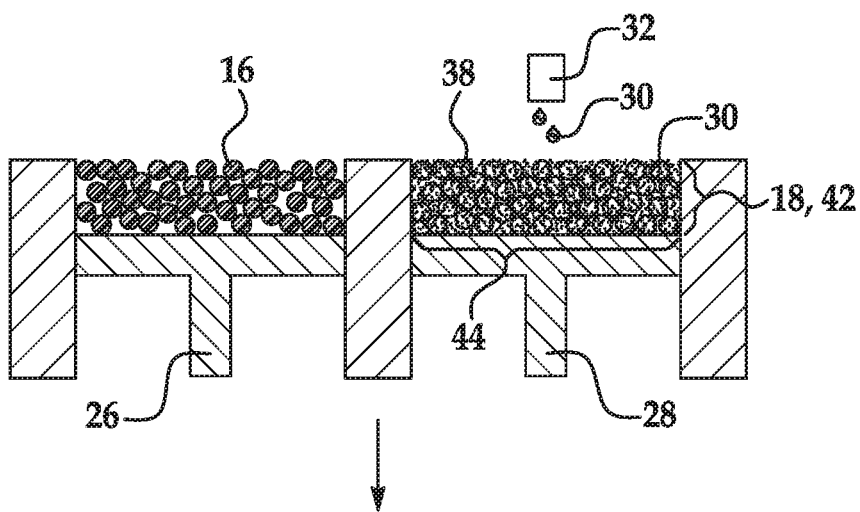
Figure 6C:
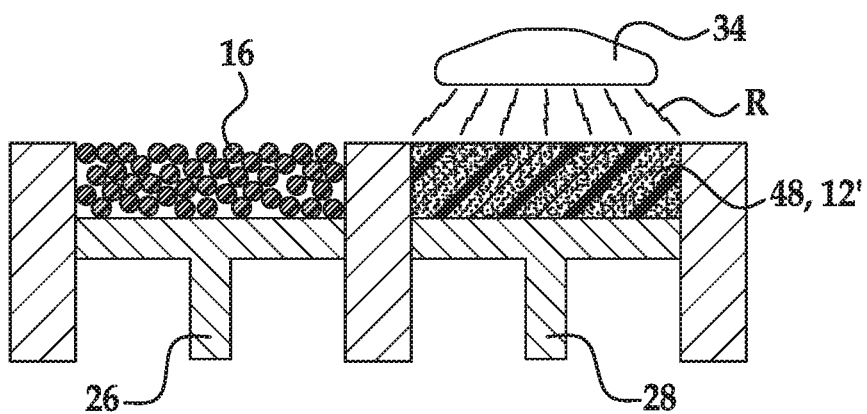

Referring now to FIGS. 6A-6C, still another example of the 3D printing method is shown. As shown in FIG. 6A, the method includes applying the polymeric build material 16. As depicted, one layer 18 of the polymeric build material 16 has been applied. The polymeric build material 16 may be applied using the printing system 20. The polymeric build material 16 may also be pre-heated in the fabrication bed 24.

Also as shown in FIG. 6A, the mechanical tailoring agent 38 is selectively applied on at least a portion of the polymeric build material 16. In the example shown in FIG. 6A, the mechanical tailoring agent 38 is applied to all of the polymeric build material 16, although it could be applied to less than all of the polymeric build material 16. Any of the mechanical tailoring agents 38 previously described may be applied, depending upon the mechanical property that is to be imparted. A single mechanical tailoring agent 38 may be applied in a suitable pattern or two or more mechanical tailoring agents 38 may be applied in different patterns.

The application of the mechanical tailoring agent(s) 38 forms a pre-composite layer 42, which is ultimately fused to form the composite layer/portion having the mechanical property/feature 12'. The pre-composite layer 42 may be fused to form all of the fused layer 48 (see FIG. 6C) or less than all of the fused layer 48. The pre-composite layer 42 makes up all of the fused layer 48 when there is no area of the build material layer 18 that is not in contact with the mechanical tailoring agent 38. The pre-composite layer 42 makes up less than all of the fused layer 48 when there is an area of the build material layer 18 that is not in contact with the mechanical tailoring agent 38. In the example shown at FIGS. 6A-6C, the pre-composite layer 42 is fused to form all of the fused layer 48.

The mechanical tailoring agent(s) 38 may be applied in a single pass or in multiple passes using the printhead 32'. The thickness of the pre-composite layer 42 may be increased by adding additional mechanical tailoring agent 38.

After each pass, or after the desired amount of the mechanical tailoring agent 38 is applied to the polymeric build material 16, the polymeric build material 16 and the mechanical tailoring agent 38 may be exposed to a treatment (e.g., annealing, chemical treatment, etc.) to accelerate evaporation of the aqueous formulation (when present in agent 38) and/or to enhance the mechanical property. As mentioned above, it is to be understood that some mechanical tailoring agents 38 have an aqueous formulation that evaporates upon being dispensed, and also do not require mechanical property enhancement, and thus the treatment may not be performed with all of the mechanical tailoring agents 38. Annealing takes place at any suitable temperature, determined, at least in part, by the liquid vehicle and/or bonding conditions for the material (e.g., the plasticizer or the mechanical reinforcer) used in the mechanical tailoring agent 38.

Multiple passes and curing may be used to build up the loading of the plasticizer or mechanical reinforcer without the significant cooling effect that a single pass with high loading of mechanical tailoring agent 38 can cause.

As shown in FIG. 6B, the fusing agent 30 is selectively applied on at least a portion(s) 44 of the polymeric build material 16. Any of the previously described fusing agents 30 may be used, and the fusing agent 30 may be selectively applied using the printhead 32. In the example shown in FIG. 6B, the fusing agent 30 is selectively applied on the same portion of the polymeric build material 16 to which the mechanical tailoring agent 38 is applied.

In the example shown in FIGS. 6A, and 6B, the mechanical tailoring agent 38 is applied separate from and prior to the application of the fusing agent 30. It is to be understood that the fusing agent 30 may be applied separate from and prior to the application of the mechanical tailoring agent 38.

It is also to be understood that the mechanical tailoring agent 38 and the fusing agent 30 may be applied together (e.g., simultaneously as separate agents 38, 30 or when present in a single agent). As mentioned above, the material (e.g., the plasticizer or the mechanical reinforcer) of the mechanical tailoring agent 38 and the radiation absorbing agent of the fusing agent 30 may be combined in the same liquid formulation and dispensed by a single applicator. The mechanical tailoring agent 38 and the fusing agent 30 may be applied together when the pre-composite layer 42 is to be fused to form all or a portion of the fused layer 48. The mechanical tailoring agent 38 and the fusing agent 30 may also be applied together so that the additional cooling effect of the mechanical tailoring agent 38 may be balanced with the correct amount of radiation absorbing agent.

As shown in FIG. 6C, after the fusing agent 30 is selectively applied, the entire layer 18 of the polymeric build material 16 is exposed to radiation R. The radiation R is emitted from the radiation source 34, which may be any of the example radiation sources described herein. The fusing agent 30 enhances the absorption of the radiation R, converts the absorbed radiation to thermal energy, and promotes the transfer of the thermal heat to the polymeric build material 16 in contact therewith. In an example, the fusing agent 30 sufficiently elevates the temperature of the polymeric build material 16 above the melting point(s), allowing curing (e.g., sintering, binding, fusing, etc.) of the polymeric build material particles to take place.

When the mechanical tailoring agent 38 and the fusing agent 30 are applied separately and the pre-composite layer 42 is fused to form less than all of the fused layer 48, a greater amount of the fusing agent 30 may be applied on the pre-composite layer 42 than on the remaining region of the portion(s) 44. This may be done when the mechanical tailoring agent 38 does not include a radiation absorber. When the mechanical tailoring agent 38 does not include a radiation absorber, the mechanical tailoring agent 38 may provide an additional cooling effect (as compared to the cooling effect experience by the remaining region of the portion(s) 44, without the mechanical tailoring agent 38 applied thereto) without any additional thermal energy converted from the radiation R. To counteract the additional cooling effect, additional fusing agent 30 may be applied to the pre-composite layer 42. The additional fusing agent 30 may supply additional thermal energy to the pre-composite layer 42 by converting additional radiation R to thermal energy. The additional thermal energy counteracts the additional cooling effect.

Exposure to radiation R forms a layer 48 of the 3D object/part having the different mechanical property 12' imparted thereto. In the example shown in FIG. 6C, the entire layer 48 is a composite layer having the different mechanical property 12'. The layer 48 may be referred to as a "volume feature," in part because the different mechanical property 12' is imparted throughout at least a portion of the volume of the layer 48 that is formed. This volume approach is useful for creating globally ductile or globally rigid parts.

Any unfused polymeric build material 16 may be removed from the layer 48.

While all of the polymeric build material 16 in the fabrication bed 24 is shown forming the layer 48 in FIGS. 6A-6C, it is to be understood that the mechanical tailoring agent 38 and the fusing agent 30 may be applied to the same portion of the polymeric build material 16 which makes up less than all of the polymeric build material 16 in the layer 18. The remaining untreated polymeric build material 16 in the layer 18 (i.e., which doesn't have either the mechanical tailoring agent 38 or the fusing agent 30 thereon) may be left untreated and may be removed after fusing. The remaining untreated polymeric build material 16 in the layer 18 (i.e., which doesn't have either the mechanical tailoring agent 38 or the fusing agent 30 thereon) may also be patterned with the fusing agent 30 alone in order to define a layer that partially or fully surrounds the volume feature layer 48 after fusing.

Still further, in the example of the method shown in FIGS. 6A-6C, annealing conditions that are separate from the fusing conditions may not be not required. For example, if the solvent(s) and/or surfactants of the mechanical tailoring agent 38 may be driven off under the fusing conditions, the annealing may be skipped. The mechanical tailoring agent 38 and the fusing agent 30 may be selectively applied simultaneously, and then exposed to the radiation R. Radiation exposure (without additional annealing) will form the layer 48 as well as drive off any solvent.

To further illustrate the present disclosure, examples are given herein. It is to be understood that these examples are provided for illustrative purposes and are not to be construed as limiting the scope of the present disclosure.

EXAMPLES

Example 1

Two example mechanical tailoring agents were prepared. The example mechanical tailoring agents are referred to herein as example mechanical tailoring agent 1 and example mechanical tailoring agent 2. Both example mechanical tailoring agents were plasticizer liquids and contained a plasticizer. The compositions for the example mechanical tailoring agents are shown in Tables 1 and 2.

TABLE 1 example mechanical tailoring agent 1

| Ingredient | Specific component | Formulation Wt % |
|---|---|---|
| Plasticizer | 2-pyrrolidone | 48.00 |
| Surfactant | SURFYNOL ® SE-F | 0.3 |
|  | CAPSTONE ® FS-35 | 0.02 |
| Anti-Kogation Agent | CRODAFOS ® O3A | 0.2 |
| Dispersant | CARBOSPERSE ® 7028 | 0.004 |
| Biocide | PROXEL ® GXL | 0.072 |
|  | KORDEK ® MLX | 0.056 |
| Chelating Agent | TRILON ® M | 0.016 |
| Water |  | balance |

TABLE 2 example mechanical tailoring agent 2

| Ingredient | Specific component | Formulation Wt % |
|---|---|---|
| Plasticizer | Dimethyl sulfoxide | 40.00 |
|  | 2-pyrrolidone | 8.00 |
| Surfactant | SURFYNOL ® SE-F | 0.3 |
|  | CAPSTONE ® FS-35 | 0.02 |
| Anti-Kogation Agent | CRODAFOS ® O3A | 0.2 |
| Dispersant | CARBOSPERSE ® 7028 | 0.004 |
| Biocide | PROXEL ® GXL | 0.072 |
|  | KORDEK ® MLX | 0.056 |
| Chelating Agent | TRILON ® M | 0.016 |
| Water |  | balance |

Three dogbones were printed with polyamide 12 as the build material, example mechanical tailoring agent 1 as the mechanical tailoring agent, and black matte HP ink (for DESIGNJET® 761) as the fusing agent. For each layer of the dogbones, a layer of the polyamide 12 was applied to the powder bed surface and then the fusing agent and example mechanical tailoring agent 1 were applied in the dogbone pattern. Example parts 1-3 were formed by applying example mechanical tailoring agent 1 in a single pass (with 4 pens) at the following values: (1) 4 drops per $1/600^{th}$ of an inch (16 wt % plasticizer in example part 1), (2) 8 drops per $1/600^{th}$ of an inch (28 wt % plasticizer in example part 2), and (3) 16 drops per $1/600^{th}$ of an inch (43 wt % plasticizer in example part 3). Comparative part 1 was formed with no mechanical tailoring agent 1 applied thereto, and thus was at 0 drops per $1/600^{th}$ of an inch (0 wt % plasticizer). Fusing was accomplished using 3 passes of halogen lamps to raise the temperature to about 190° C.

Figure 7:
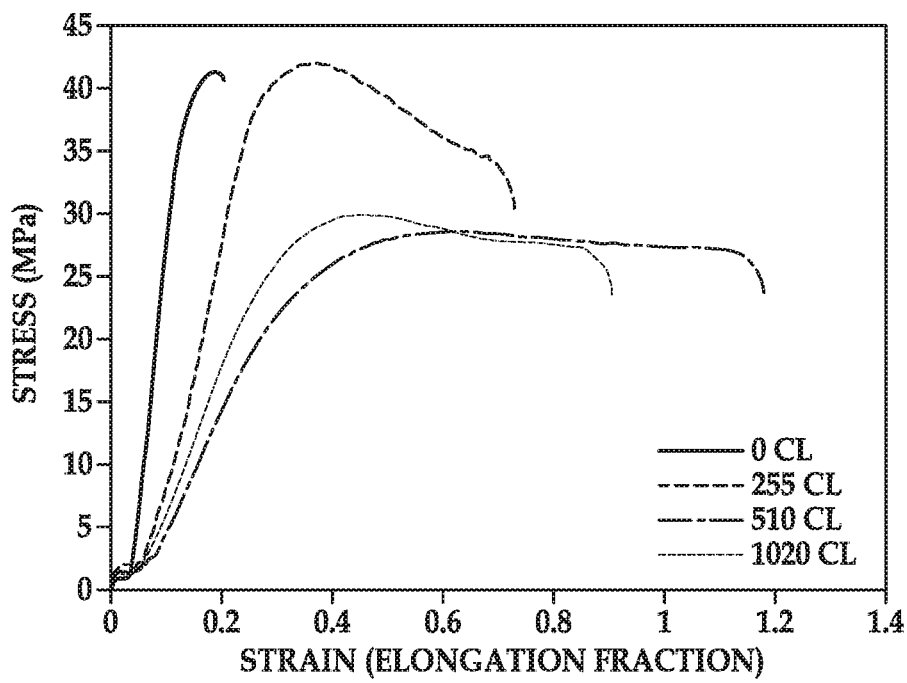
FIG. 7 is a graph depicting stress versus elongation/strain fractions of example parts formed according to an example of the 3D printing method disclosed herein and a comparative part formed without a mechanical tailoring agent.
Figure 8:
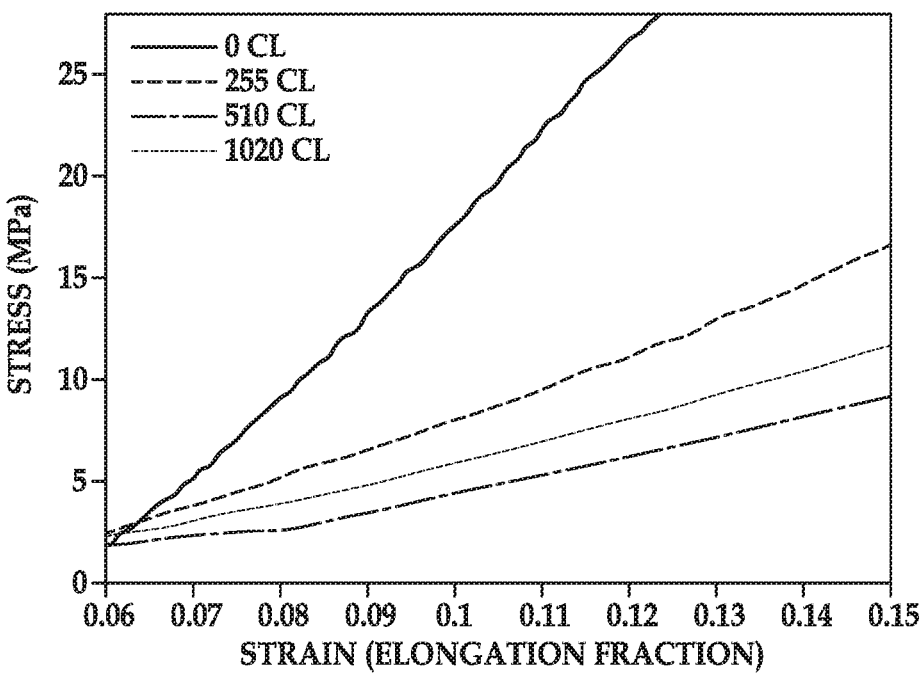
FIG. 8 is a graph depicting an enlarged portion of the graph of FIG. 7, illustrating the elastic regime.

The dogbones were tested for elongation/strain at break (elasticity) and modulus with a tensiometer. The results of the elongation/strain at break (elasticity) measurements are shown in FIG. 7. The stress values in MPa are shown along the Y axis and the elongation/strain fractions are shown along the X axis. As shown in FIG. 7, an increased number of drops of the mechanical tailoring agent 1, and thus increased plasticizer level, generally results in improved ductility, as demonstrated by improved elongation at break and toughness. An enlargement at the elastic regime of the stress/strain curve of FIG. 7 is shown in FIG. 8. The stress values in MPa are shown along the Y axis and the elongation/strain fractions are shown along the X axis. As shown in FIG. 8, a dramatic decrease in tensile modulus is observed with the included plasticizer. Increased flexibility of Examples parts 1-3 was observed, due in large part to the decrease in tensile modulus.

Two additional dogbones (example parts 4 and 5) were printed with polyamide 12 as the build material and black matte HP ink (for DESIGNJET® 761) as the fusing agent. Each layer of example part 4 was printed in three passes with 12 drops of a diluted version of example mechanical tailoring agent 1 per $1/600^{th}$ of an inch of build material. Diluted example mechanical tailoring agent 1 has the composition of example mechanical tailoring agent 1, but diluted with water so that the amount of 2-pyrrolidone was 26 wt %. The plasticizer amount in the formed dogbone (example part 4) was about 8 wt %. Each layer of example part 5 was printed in three passes with 12 drops of a diluted version of example mechanical tailoring agent 2 per $1/600^{th}$ of an inch of build material, so that the plasticizer amount in the formed dogbone was also about 8 wt %. Diluted example mechanical tailoring agent 2 has the composition of example mechanical tailoring agent 2, but diluted with water so that the amount of dimethyl sulfoxide was 26 wt %.

Figure 9:
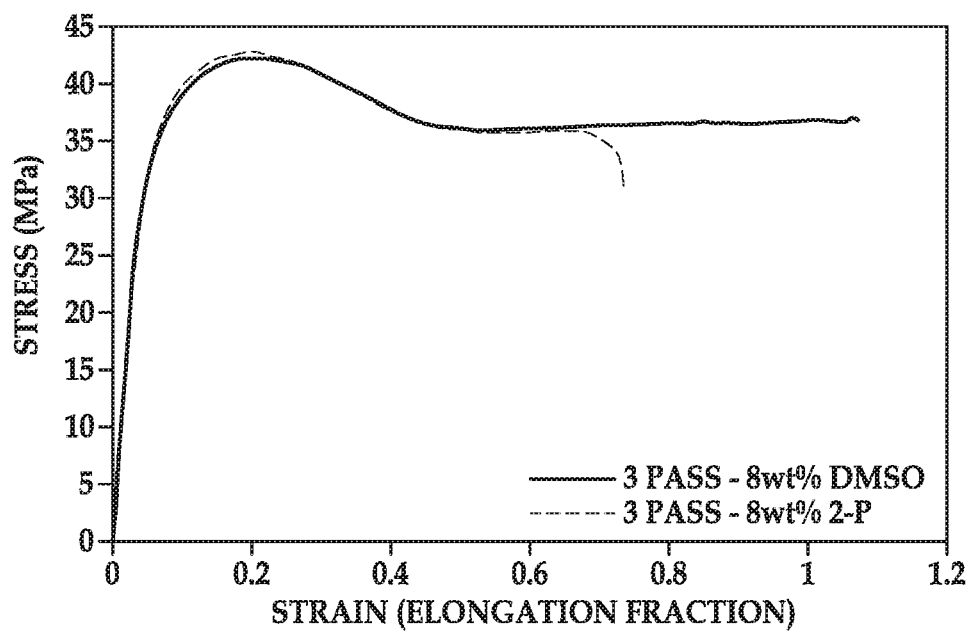
FIG. 9 is a graph depicting stress versus elongation/strain fractions of example parts formed according to an example of the 3D printing method disclosed herein.

The example 4 and 5 dogbones were tested for elongation/strain at break (elasticity) with a tensiometer. The results of the elongation/strain at break (elasticity) measurements for these examples are shown in FIG. 9. The stress values in MPa are shown along the Y axis and the elongation/strain fractions are shown along the X axis. As shown in FIG. 9, when three application and cure cycles of the respective mechanical tailoring agents are performed per layer, a max stress of over 42 MPa is still observed while the elongation at break is increased to over 100%.

Two additional dogbones (example parts 6 and 7) were printed with polyamide 12 as the build material and black matte HP ink (for DESIGNJET® 761) as the fusing agent. Each layer of example part 6 was printed in one pass with 4 drops of example mechanical tailoring agent 1 per $1/600^{th}$ of an inch of build material, so that the plasticizer amount in the formed dogbone was also about 22 wt %. Each layer of the example part 7 was printed in two passes with 8 drops of example mechanical tailoring agent 1 per 1/600th of an inch of build material, so that the plasticizer amount in the formed dogbone was also about 36 wt %.

Figure 10:
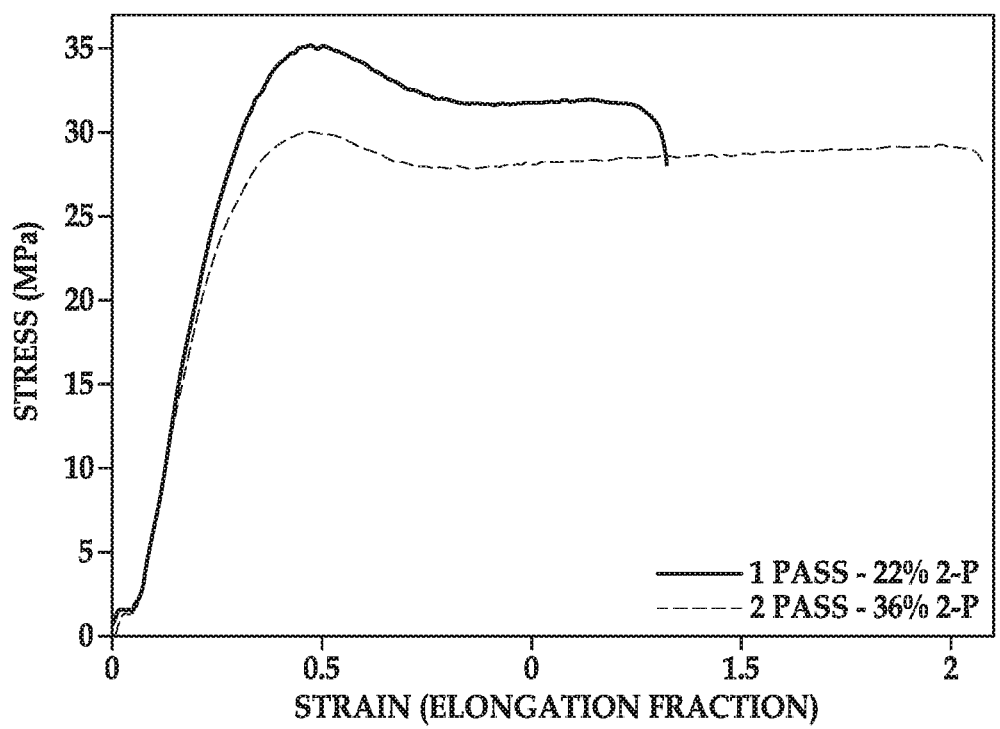
FIG. 10 is a graph depicting stress versus elongation/strain fractions of example parts formed according to an example of the 3D printing method disclosed herein.

The example 6 and 7 dogbones were tested for elongation/strain at break (elasticity) with a tensiometer. The results of the elongation/strain at break (elasticity) measurements are shown in FIG. 10. The stress values in MPa are shown along the Y axis and the elongation/strain fractions are shown along the X axis. As shown in FIG. 10, example part 7, formed with two application and cure cycles of the mechanical tailoring agent per layer, exhibited an elongation at break over 200%, while still holding a max stress of 30 MPa.

The ductility of example part 4 (with 8 wt % 2-pyrrolidone) improved such that one end of the dogbone could be bended back 180° toward the other end of the dog bone without the dogbone braking.

It is believed that multiple application and cure steps may help balance heating and cooling over several passes so that there is not too much cooling of the layer being processed in any single pass.

Example 2

An example mechanical tailoring agent was prepared. The example mechanical tailoring agent is referred to herein as example mechanical tailoring agent 3. Example mechanical tailoring agent 3 was a mechanical reinforcer liquid and contained a mechanical reinforcer.

Example mechanical tailoring agent 3 was prepared by adding 2 g of Nano99 powder (Available from Asbury Online) to a milling solution containing 1.25 mL of JONCRYL® 683 (at 20 wt % in water) and 2.75 mL of water to form a mixture. The mixture was milled in a planetary mill with 0.2 mm zirconia beads. The rotor speed of the mill was about 700 rotations per minute. The mixture was alternated between being milled for about 8 minutes and resting for about 22 minutes for 25 repetitions to form a dispersion. The dispersion was rinsed from the beads with water. The dispersion was then filtered with a 1.2 µm sized filter, and added to a liquid vehicle. The composition for example mechanical tailoring agent 3 is shown in Table 3.

TABLE 3 example mechanical tailoring agent 3

| Ingredient | Specific component | Formulation Wt % |
|---|---|---|
| Mechanical reinforcer | Nano99 powder | 3.3 |
| Solvent | 2-pyrrolidone | 5.6 |
| Dispersing agent | JONCRYL ® 683 | 0.8 |
| | CARBOSPERSE ® 7028 | 0.0028 |
| Surfactant | SURFYNOL ® SE-F | 0.21 |
| | CAPSTONE ® FS-35 | 0.014 |
| Anti-Kogation Agent | CRODAFOS ® O3A | 0.14 |
| Biocide | PROXEL ® GXL | 0.05 |
| | KORDEK ® MLX | 0.04 |
| Chelating Agent | TRILON ® M | 0.011 |
| Water | | Balance |

Example mechanical tailoring agent 3 was successfully printed with a thermal inkjet pen.

Example 3

Example part 8 was formed with a rigid mechanical tailoring agent (i.e., black matte HP ink for DESIGNJET® 761, with carbon black as the mechanical reinforcer) and a flexible mechanical tailoring agent (i.e., mechanical tailoring agent 1, with 2-pyrrolidone as the plasticizer).

Example part 8 was printed with polyamide 12 as the build material. 100 µm of the polyamide 12 powder was used per layer of example part 8. The part included a flexible portion at one end, a rigid portion at the opposite end and a gradient portion between the flexible portion and the rigid portion. The fabrication bed temperature was maintained at about 135° C.

The flexible portion was formed with 2 drops (per 1/600th of an inch) of DESIGNJET® 761 cyan ink to impart color, 12 drops (per 1/600th of an inch) of mechanical tailoring agent 1, and 4 drops (per 1/600th of an inch) of a near infrared dye (the composition of which is shown in Table 4), so that the plasticizer amount in the flexible portion was about 35 wt %.

TABLE 4

Near Infrared Dye

| Ingredient | Specific component | Formulation Wt % |
|---|---|---|
| Colorant | Dye 7 | 3 |
| Solvent | 2-pyrrolidone | 5 |
| | 1,6-Hexanediol | 9 |
| | 1-(2-Hydroxyethyl)-2-Pyrrolidone | 9 |
| Surfactant | SURFYNOL ® CT 211 | 0.16 |
| | POLYFOX ® PF-154N | 0.8 |
| | DOWFAX ® 2A1 | 0.57 |
| Anti-Kogation Agent | CRODAFOS ® O3A | 0.38 |
| Biocide | PROXEL ® GXL | 0.1 |
| Buffer | MOPS buffer | 0.18 |
| Chelating Agent | EDTA-Na | 0.1 |
| Water | | Balance |

The rigid portion was formed with 4 drops (per 1/600th of an inch) of the rigid mechanical tailoring agent, so that the carbon black amount in the rigid portion was about 2 wt %.

The gradient portion consisted of the flexible portion components on the side adjacent to the flexible portion, with all of these components going to zero on the side adjacent to the rigid portion. The gradient portion did not include any of the rigid mechanical tailoring agent on the side adjacent to the flexible portion, and included 0.4 drops per 1/600th of an inch) of the rigid mechanical tailoring agent on the side adjacent to the rigid portion.

4 fusing passes, at 5, 18, 11.5, and 20 inches/second, were used to fuse example part 8, and the fusing lamps were positioned on an overhead carriage. The flexible portion components were applied during the first pass, and the rigid portion component was applied during the fourth pass. The maximum temperature for each portion ranged from about 180° C. to about 185° C.

The flexible portion of example part 8 was able to be bent 180° without breaking, while the rigid portion was not bendable. While the rigid portion was held, the flexible portion was able to be twisted without breaking.

Example 4

Example part 9 was a flexible part formed with polyamide 12 as the build material. 100 µm of the polyamide 12 powder was used per layer. Example part 9 was formed with 2 drops (per 1/600th of an inch) of DESIGNJET® 761 cyan ink to impart color, 12 drops (per 1/600th of an inch) of mechanical tailoring agent 1, and 4 drops (per 1/600th of an inch) of a near infrared dye (the composition of which is shown in Table 4), so that the plasticizer amount throughout the part was about 36 wt %.

The fabrication bed temperature was maintained at about 137° C.

4 fusing passes, at 20, 20, 18, and 10.5 inches/second, were used to fuse example part 9, and the fusing lamps were positioned on an overhead carriage. The components were applied during the first pass. The maximum temperature for the part ranged from about 185° C. to about 190° C.

Example part 9 was the same across the part, and exhibited flexibility. The part could be twisted and bent without breaking.

Example 5

Six dogbone parts (labeled 11-16) were formed with different loadings of the rigid mechanical tailoring agent (i.e., black matte HP ink for DES IGNJET® 761, with carbon black as the mechanical reinforcer) and the flexible mechanical tailoring agent (i.e., mechanical tailoring agent 1, with 2-pyrrolidone as the plasticizer) along the entire part. The various loadings for each of parts 11-16 are shown in Table 5.

TABLE 5

| | Example parts 11-16 | |
|---|---|---|
| Example Part | rigid mechanical tailoring agent (drops per 1/600th inch) | mechanical tailoring agent 1 (drops per 1/600th inch) |
| 11 | 0.110 | 0 |
| 12 | 0.125 | 1.18 |
| 13 | 0.141 | 2.35 |
| 14 | 0.157 | 3.53 |
| 15 | 0.173 | 4.71 |
| 16 | 0.188 | 5.88 |

Each of the example parts 11-16 was printed with polyamide 12 as the build material. 100 μm of the polyamide 12 powder was used per layer of example parts 11-16. The fabrication bed temperature was maintained at about 144° C.

4 fusing passes, at 20, 20, 20, and 20 inches/second, were used to fuse example parts 11-16, and the fusing lamps were positioned on an overhead carriage. Both the mechanical tailoring agent 1 (when used) and the rigid mechanical tailoring agent were applied during the first pass. The maximum temperature for each portion ranged from about 192° C. to about 193° C.

Example part 11 was the most rigid of the parts (it would not bend at all), and the flexibility of the parts increased as the amount of the mechanical tailoring agent 1 was increased.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 μm to about 500 μm should be interpreted to include the explicitly recited limits of about 1 μm to about 500 μm, as well as individual values, such as 50 μm, 125 μm, 300.5 μm, 495 μm, etc., and sub-ranges, such as from about 35 μm to about 375 μm, from about 60 μm to about 225 μm, from about 115 μm to about 455 μm, from about 200 μm to about 475 μm, etc. Furthermore, when "about" is utilized to describe a value, this is meant to encompass minor variations (up to +/−10%) from the stated value In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
applying a polymeric build material;
selectively applying a fusing agent on at least a portion of the polymeric build material;
selectively applying a mechanical tailoring agent on at least a region of the portion; and
exposing the polymeric build material to radiation, thereby fusing the at least the portion of the polymeric build material in contact with the fusing agent to form a layer;
wherein the mechanical tailoring agent forms a composite layer in the at least the region, and wherein the composite layer has a different mechanical property than that of an area of the layer not in contact with the mechanical tailoring agent.

2. The method as defined in claim 1 wherein:
the composite layer includes all of the layer; or
the composite layer includes less than all of the layer.

3. The method as defined in claim 2 wherein one of:
the composite layer includes less than all of the layer, wherein the selectively applying of the mechanical tailoring agent is accomplished separate from the selectively applying of the fusing agent, and wherein the selectively applying of the fusing agent includes applying a greater amount of the fusing agent to the region of the portion than to a remaining region of the portion; or
the composite layer includes all of the layer and wherein the selectively applying of the fusing agent is accomplished together with the selectively applying of the mechanical tailoring agent.

4. The method as defined in claim 1 wherein one of:
the selectively applying of the fusing agent is accomplished separate from and prior to the selectively applying of the mechanical tailoring agent; or
the selectively applying of the mechanical tailoring agent is accomplished separate from and prior to the selectively applying of the fusing agent.

5. The method as defined in claim 1 wherein the selectively applying of the mechanical tailoring agent is accomplished by thermal inkjet printing or piezoelectric inkjet printing.

6. The method as defined in claim 1 wherein the mechanical tailoring agent is a plasticizer liquid including a plasticizer, and wherein the composite layer has greater ductility than that of the area of the layer not in contact with the mechanical tailoring agent.

7. The method as defined in claim 6 wherein:
the plasticizer liquid includes the plasticizer and a solvent;
the plasticizer is selected from the group consisting of 2-pyrrolidone, dimethyl sulfoxide (DMSO), methyl 4-hydroxybenzoate, dioctyl phthalate, N-methyl-2-pyrrolidone, N-2-hydroxyethyl-2-pyrrolidone, urea, ethylene carbonate, propylene carbonate, lactones, diethylene glycol, triethylene glycol, tetraethylene glycol, decalin, gamma-butyrolactone, dimethylformamide, phenylmethanol, and mixtures thereof; and the solvent is selected from the group consisting of water, N-2-hydroxyethyl-2-pyrrolidone, 1,6-hexanediol, dimethyl sulfoxide (DMSO), isopropyl alcohol, ethanol, acetone, and mixtures thereof.

8. The method as defined in claim 6 wherein the plasticizer is included in an amount ranging from about 1 wt % to about 100 wt % based on the total wt % of the plasticizer liquid.

9. The method as defined in claim 1 wherein the mechanical tailoring agent is a mechanical reinforcer liquid including a mechanical reinforcer, and wherein the composite layer has greater rigidity than that of the area of the layer not in contact with the mechanical tailoring agent.

10. The method as defined in claim 9 wherein:

the mechanical reinforcer liquid includes the mechanical reinforcer, a solvent, and a dispersant;

the mechanical reinforcer is graphene, carbon black, boron nanomaterial, boron nitride nanomaterial, carbon nanomaterial, silica nanomaterial, alumina nanomaterial, titanium dioxide nanomaterial, glass nanomaterial, montmorillonite nanomaterial, talc nanomaterial, basalt nanomaterial, silicon carbide nanomaterial, metal carbide nanomaterial, silicon nitride nanomaterial, metal nitride nanomaterial, polyaramide nanomaterial, metal nanomaterial, metal alloy nanomaterial, diamond nanomaterial, boron carbide nanomaterial, mica nanomaterial, wollastonite nanomaterial, ceramic nanomaterial, and combinations thereof; and the solvent is selected from the group consisting of water, 1-(2-hydroxyethyl)-2-pyrrolidinone, 1,6-hexanediol, dimethyl sulfoxide (DMSO), isopropyl alcohol, ethanol, acetone, N-methyl-2-pyrrolidone, dimethyl formamide, cyclohexyl pyrrolidone, and mixtures thereof.

11. The method as defined in claim 9 wherein the mechanical reinforcer is a cross-linking agent.

12. A three-dimensional (3D) printing method, comprising:

applying a polymeric build material;

selectively applying a fusing agent on at least a portion of the polymeric build material;

exposing the polymeric build material to radiation, thereby fusing the at least the portion of the polymeric build material in contact with the fusing agent to form a layer; and selectively applying a mechanical tailoring agent on at least a portion of the layer, thereby forming a mechanical component on the at least the portion of the layer or preparing the at least the portion of the layer to receive additional build material that will absorb the mechanical tailoring agent.

13. The method as defined in claim 12, further comprising annealing the at least the portion of the layer in contact with the mechanical tailoring agent.

14. The method as defined in claim 12 wherein the mechanical component is formed, and wherein the method further comprises at least partially embedding the mechanical component by:

applying additional polymeric build material on the layer;

selectively applying the fusing agent on at least a portion of the additional polymeric build material; and exposing the additional polymeric build material to radiation, thereby fusing the at least the portion of the additional polymeric build material.

15. The method as defined in claim 14 wherein the selectively applying of the fusing agent is accomplished by applying the fusing agent on the at least the portion of the additional build material that does not cover the mechanical component.

* * * * *